(12) United States Patent
Yanahara et al.

(10) Patent No.: US 12,325,162 B2
(45) Date of Patent: Jun. 10, 2025

(54) INJECTION MOLDING SYSTEM WITH CONVEYOR DEVICES TO INSERT OR EJECT MOLDS

(71) Applicants: Canon Virginia, Inc., Newport News, VA (US); CANON U.S.A., INC., Melville, NY (US)

(72) Inventors: Yuichi Yanahara, Moriyama (JP); Koki Kodaira, Tokyo (JP); Yohei Minatoya, Bunkyo-ku (JP); Junko Tajima, Amsterdam (NL)

(73) Assignees: Canon Virginia, Inc., Newport News, VA (US); Canon U.S.A., Inc., Melville, NY (US)

( * ) Notice: Subject to any disclaimer, the term of this patent is extended or adjusted under 35 U.S.C. 154(b) by 543 days.

(21) Appl. No.: 17/602,264

(22) PCT Filed: Apr. 7, 2020

(86) PCT No.: PCT/US2020/027106
§ 371 (c)(1),
(2) Date: Oct. 7, 2021

(87) PCT Pub. No.: WO2020/210259
PCT Pub. Date: Oct. 15, 2020

(65) Prior Publication Data
US 2022/0161472 A1    May 26, 2022

Related U.S. Application Data

(60) Provisional application No. 62/832,703, filed on Apr. 11, 2019.

(51) Int. Cl.
B29C 45/17    (2006.01)

(52) U.S. Cl.
CPC .. *B29C 45/1756* (2013.01); *B29C 2045/1786* (2013.01)

(58) Field of Classification Search
CPC . B29C 45/17; B29C 45/1705; B29C 45/1708; B29C 45/1709; B29C 45/1742; B29C 45/1754; B29C 45/1756
See application file for complete search history.

(56) References Cited

U.S. PATENT DOCUMENTS

| 4,124,343 A | 11/1978 | Makinson et al. |
| 5,854,631 A | 12/1998 | Linehan |

(Continued)

FOREIGN PATENT DOCUMENTS

| JP | H 9-66543 A | 3/1997 | |
| JP | H1086196 A | * 4/1998 | ......... B29C 33/0083 |

(Continued)

*Primary Examiner* — Thu Khanh T. Nguyen
(74) *Attorney, Agent, or Firm* — Canon U.S.A., Inc., IP Division

(57) ABSTRACT

An injection molding system includes an injection molding apparatus configured to perform injection molding with a mold, a conveyor apparatus configured to move the mold along a supporting plane; and a cable carrier configured to cover a cable connected to the mold, wherein a shape of the cable carrier changes for guiding the cable based on a movement of the mold by the conveyor apparatus, and wherein at least one of a first end of the cable carrier or a second end of the cable carrier are located below the supporting plane in a direction perpendicular to the supporting plane.

20 Claims, 18 Drawing Sheets

(56) References Cited

U.S. PATENT DOCUMENTS

| | | | |
|---|---|---|---|
| 10,857,707 B2 * | 12/2020 | Miyaki | ............... B29C 45/1628 |
| 11,104,050 B2 | 8/2021 | Nakamura | |
| 2003/0154004 A1 | 8/2003 | Kroeger et al. | |
| 2003/0224085 A1 | 12/2003 | Onuma et al. | |
| 2018/0009146 A1 | 1/2018 | Nakamura | |

FOREIGN PATENT DOCUMENTS

| | | | | |
|---|---|---|---|---|
| JP | 2000309045 A | * | 11/2000 | ......... B29C 33/0083 |
| JP | 2012224008 A | * | 11/2012 | ............. B29C 45/06 |
| JP | 6121601 B1 | | 4/2017 | |

* cited by examiner

INJECTION MOLDING SYSTEM WITH CONVEYOR DEVICES TO INSERT OR EJECT MOLDS

CROSS-REFERENCE TO RELATED APPLICATION

This application claims the benefit of U.S. Provisional Application 62/832,703, which was filed on Apr. 11, 2019.

BACKGROUND

Manufacturing of molded parts by an injection molding machine includes injecting a resin into a mold after clamping the mold, pressing the resin into the mold at a high pressure in order to compensate for a volume decrease due to solidification of the resin, keeping the molded part in the mold until the resin solidifies, and ejecting the molded part from the mold.

In this type of molding approach, a method that uses two molds with one injection molding machine in order to enhance productivity has been proposed. For example, US 2018/0009146/ Japanese patent publication No. 2018-001738/VN20160002505 are seen to discuss a system in which conveying devices 3A and 3B are arranged on both sides of an injection molding machine 2. In this system, molded parts are manufactured while alternating a plurality of molds by the conveying devices 3A and 3B for the one injection molding machine 2. FIG. 18 illustrates an injection molding system of US 2018/0009146/ Japanese patent publication No. 2018-001738/ VN20160002505.

After a predetermined number of moldings have been performed with one mold, the mold is ejected from the injection molding machine, the next mold is setup and inserted into the injection molding machine, and then a predetermined number of injection moldings with the next mold is performed. The setup processes can often take up time and resources, and during the setup processes, the injection molding machine can be in an 'idle' state. This can negatively impact overall productivity.

To perform maintenance on a nozzle mounted in the injection molding machine, there are cases where the injection molding machine is moved from its position for injection molding. The conveyor device, which inserts and ejects a mold into and from the injection molding machine, is positioned alongside the injection molding machine. As a result, there is a possibility of interfering with the conveyor device when moving the injection molding machine to perform nozzle maintenance.

SUMMARY

An injection molding system includes an injection molding apparatus configured to perform injection molding with a mold, a conveyor apparatus configured to move the mold along a supporting plane; and a cable carrier configured to cover a cable connected to the mold, wherein a shape of the cable carrier changes for guiding the cable based on a movement of the mold by the conveyor apparatus, and wherein at least one of a first end of the cable carrier or a second end of the cable carrier are located below the supporting plane in a direction perpendicular to the supporting plane.

BRIEF DESCRIPTION OF THE DRAWINGS

The accompanying drawings, which are incorporated herein and form part of the specification, illustrate various embodiments, objects, features, and advantages of the present disclosure.

Figure 1:
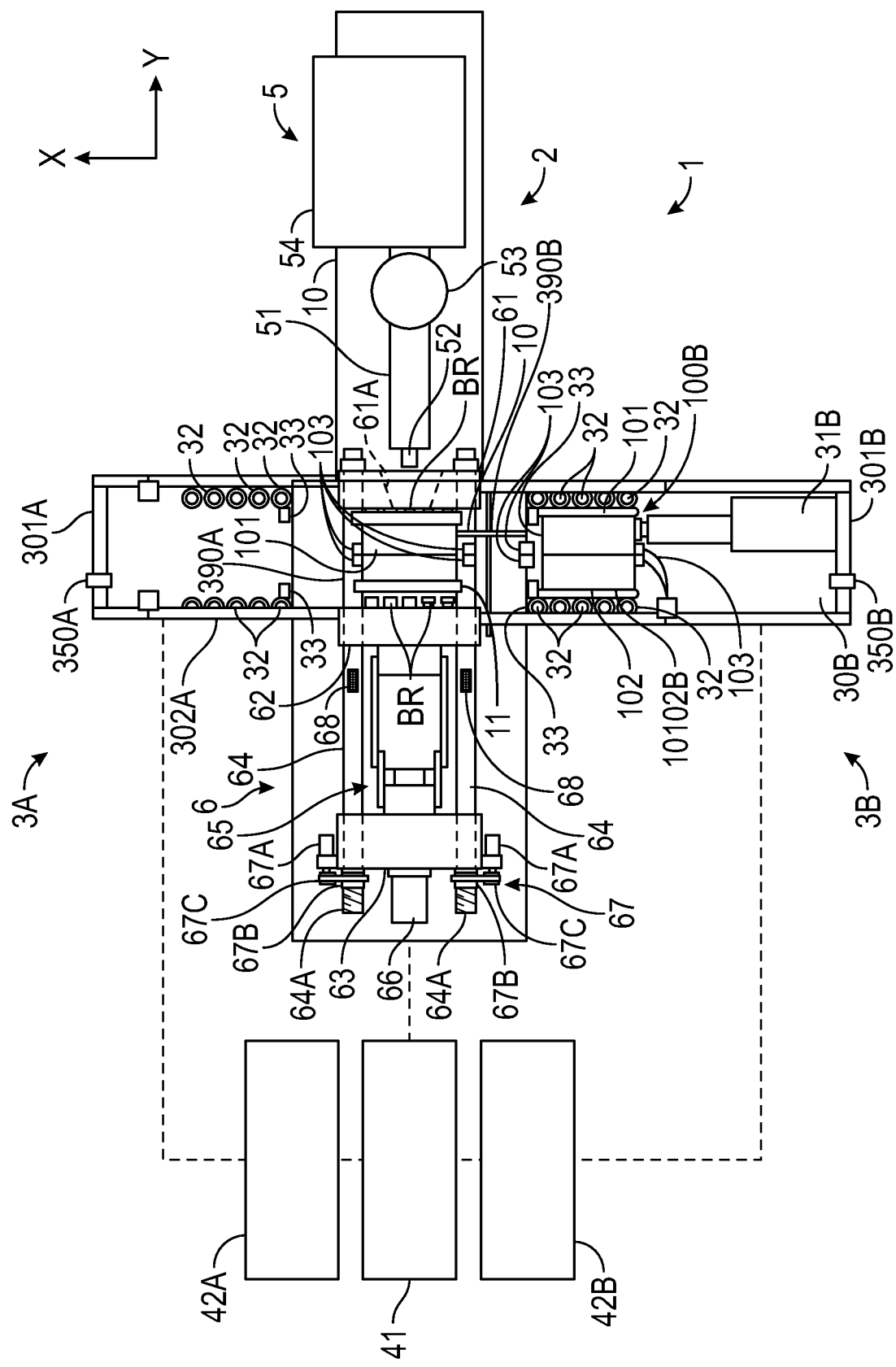
FIG. 1 illustrates an injection molding system according to an embodiment.

Throughout the Figures, the same reference numerals and characters, unless otherwise stated, are used to denote like features, elements, components or portions of the illustrated embodiments. While the subject disclosure is described in detail with reference to the Figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION OF EXEMPLARY EMBODIMENTS

The present disclosure has several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

With reference to the drawings, an injection molding system according to an embodiment of the present disclosure will be explained. The arrow symbols X and Y in each Figure indicate horizontal directions that are orthogonal to each other, and the arrow symbol Z indicates a vertical (upright) direction with respect to the ground.

FIGS. 1B and 2-4 illustrate an injection molding system discussed in US 2018/0009146/ Japanese patent publication No. 2018-001738/ VN20160002505 and are being provided herein for information/description purposes only.

The injection molding system 1 includes a horizontal type injection molding machine 2 (IMM2), and conveyor devices 3A and 3B. The injection molding system 1 is configured to manufacture molded parts while inserting and ejecting multiple molds by conveyor devices 3A and 3B. Two molds, 100A and 100B are used.

The mold 100A/100B is a pair of a fixed mold 101 and a movable mold 102, which is opened/closed in relation to the fixed mold 101. The molded part is molded by injecting a molten resin into a cavity formed between the fixed mold 101 and the movable mold 102. Clamping plates 101*a* and 102*a* are respectively fixed to the fixed mold 101 and the movable mold 102. The clamping plates 101*a* and 102*a* are used to lock the mold 100A/100B to a molding operation position 11 (mold clamping position) of the IMM2.

For the mold 100A/100B, a self-closing unit 103 is provided for maintaining a closed state between the fixed mold 101 and the movable mold 102. The self-closing unit 103 enables preventing the mold 100A/100B from opening after unloading the mold 100A/100B from the IMM2. The self-closing unit 103 maintains the mold 100A/100B in a closed state using a magnetic force. The self-closing unit 103 located at a plurality of locations along opposing surfaces of the fixed mold 101 and the movable mold 102. The self-closing unit 103 is a combination of an element on the side of the fixed mold 101 and an element on the side of the movable mold 102. For the self-closing unit 103, typically two or more pair are installed for one of the molds 100A and 100B.

A conveying device 3A loads and unloads the mold 100A onto/from the molding operation position 11 of the IMM2. A conveying device 3B loads and unloads the mold 100B onto/from the molding operation position 11. The conveying device 3A, the IMM2, and the conveying device 3B are arranged to be lined up in this order in the X-axis direction. In other words, the conveying device 3A and the conveying device 3B are arranged laterally with respect to the IMM2 to sandwich the IMM2 in the X-axis direction. The conveying devices 3A and 3B are arranged to face each other, and the conveying device 3A is arranged on one side laterally of the IMM2, and the conveying device 3B is arranged on the other side respectively adjacent. The molding operation position 11 is positioned between the conveying device 3A and the conveying device 3B. The conveying device 3A includes a frame 30, a plurality of rollers 32, and a plurality of rollers 33. The conveying device 3B includes a frame 30, a conveyance unit 31B, a plurality of rollers 32, and a plurality of rollers 33. A conveying device controller 42A controls the conveying device 3A and a conveying device controller 42B controls the conveying device 3B.

The frame 30 is a skeleton of the conveying device 3A/3B, and supports the conveyance unit 31B, and the pluralities of rollers 32 and 33. The conveyance unit 31B is an apparatus that moves the mold 100A/100B back and forth in the X-axis direction, and that removes and inserts the mold 100A/100B in relation to the molding operation position 11. The conveyance unit 31B is controlled by the conveyance device controller 42B.

The plurality of rollers 32 configure a row of rollers arranged in the X-axis direction, where two rows are configured separated in the Y-axis direction. The plurality of rollers 32 rotate around the axis of revolution in the Z-axis direction, and guide movement in the X-axis direction of the mold 100A/100B contacting the side surfaces of the mold 100A/100B (the side surfaces of the clamping plates 101*a* and 102*a*) and supporting the mold 100A/100B from the side. The plurality rollers 33 configure a row of rollers arranged in the X-axis direction, where two rows are configured separated in the Y-axis direction. The plurality of rollers 33 rotate around the axis of revolution in the Y-axis direction, and cause movement in the X-axis direction of the mold 100A/100B to be smooth, supporting the bottom surfaces of the mold 100A/100B (the bottom surfaces of the clamping plates 101*a* and 102*a*) and supporting the mold 100A/100B from below.

The controller 41 controls the IMM2, the controller 42A controls the conveyor device 3A, and the controller 42B controls the conveyor device 3B. Each of the controllers 41, 42A and 42B includes, for example, a processor such as a CPU, a RAM, a ROM, a storage device such as a hard disk, and interfaces connected to sensors or actuators (not illustrated). The processor executes programs stored in the storage device. An example of a program (control) that the controller 41 executes is described below. The controller 41 is communicably connected with the controllers 42A and 42B, and provides instructions related to the conveyance of the mold 100A/100B to the controllers 42A and 42B. The controllers 42A and 42B, if loading and unloading of the mold 100A/100B terminates, transmit a signal for operation completion to the controller 41. In addition, the controllers 42A and 42B transmit an emergency stop signal at a time of an abnormal occurrence to the controller 41.

Figure 2:
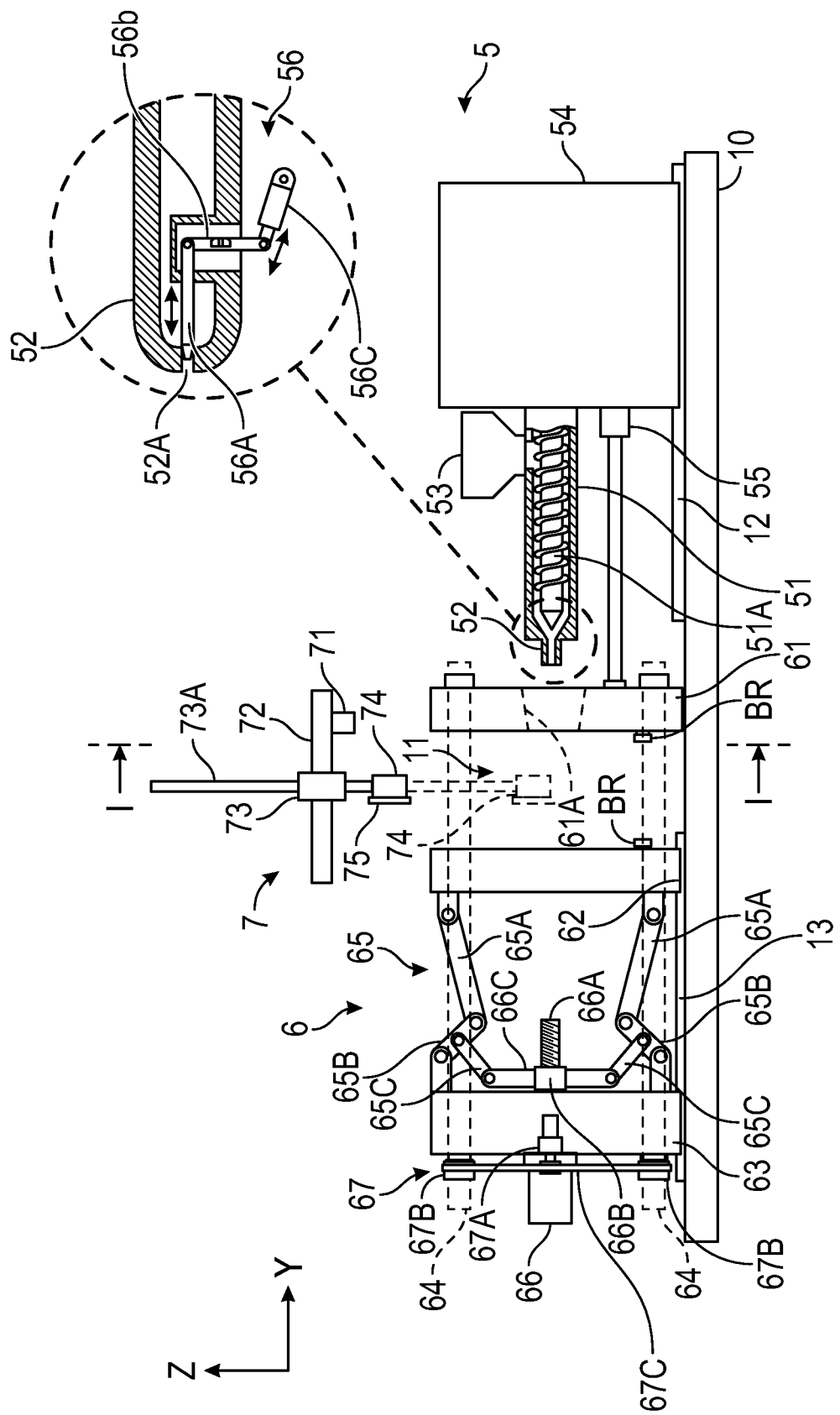
FIG. 2 is a side view of an injection molding machine.
Figure 3:
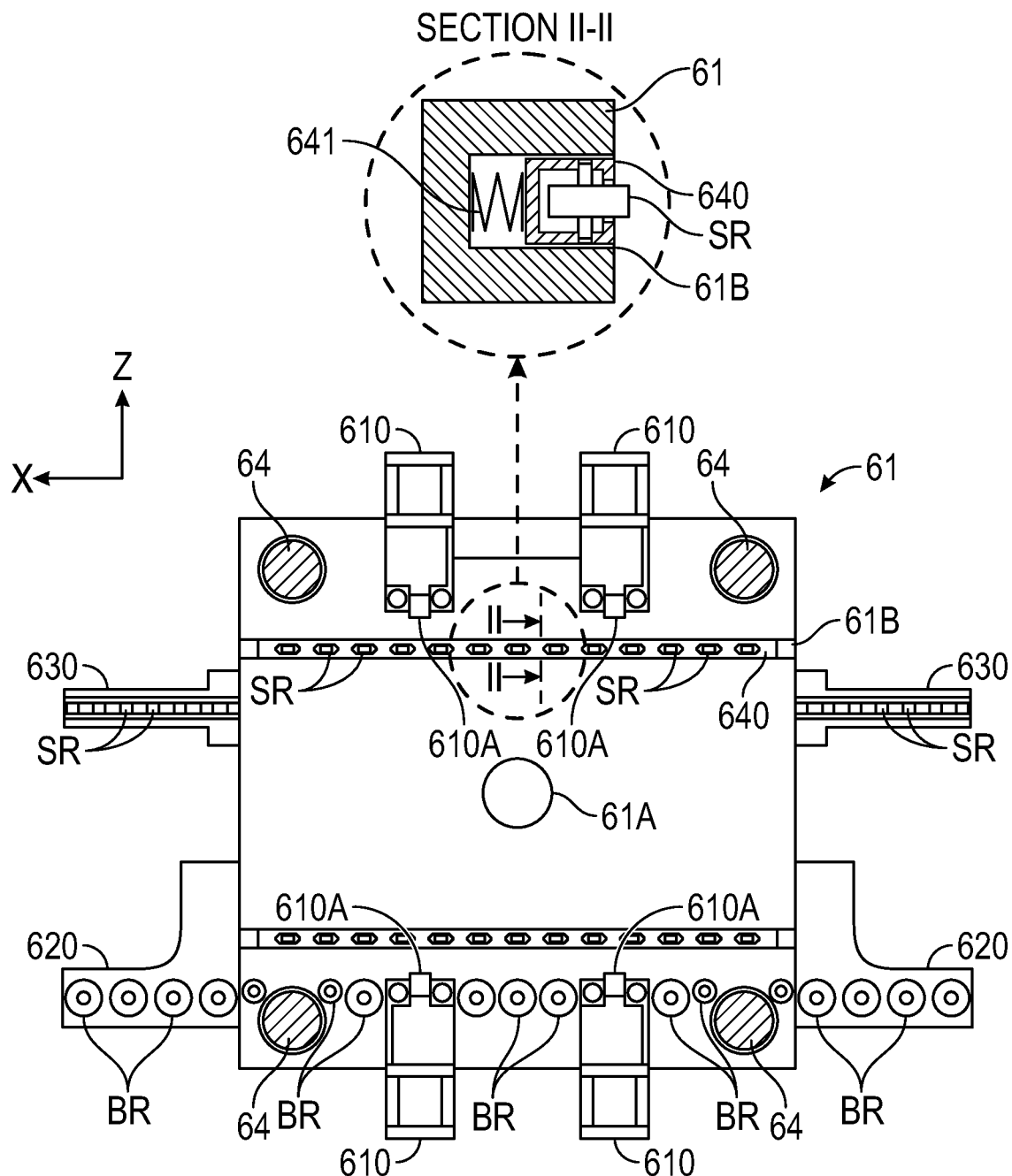
FIG. 3 is an end view of a fixed platen and a figure view from an arrow direction of line I-I in FIG. 2.
Figure 4:
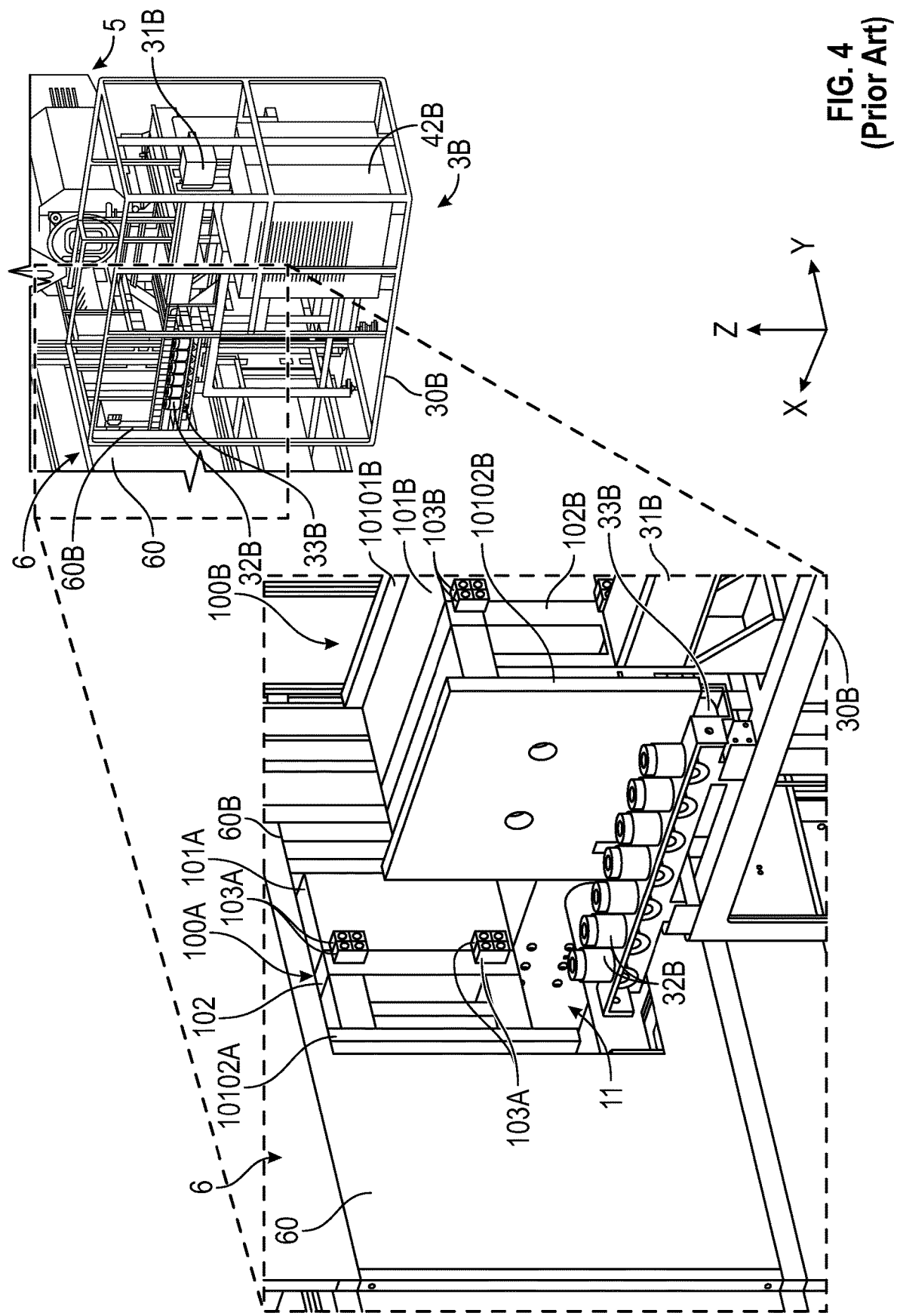
FIG. 4 is a partial perspective view of the configuration of the periphery of a molding operation position.

FIG. 2 illustrates a side view of the IMM2. FIG. 3 illustrates an end view of a fixed platen 61, and a figure viewing from the arrow direction of the I-I line in FIG. 2. FIG. 4 illustrates a partial perspective view for describing the configuration of a periphery of the molding operation position 11.

With reference to FIG. 1B and FIG. 2, the IMM2 includes an injecting apparatus 5, a clamping apparatus 6, a take-out robot 7 for ejecting a molded part, and the controller 41. The injecting equipment 5 and the clamping device 6 are arranged on a frame 10 in the Y-axis direction.

The injecting apparatus 5 includes an injection cylinder 51 that is arranged to extend in the Y-axis direction. The injection cylinder 51 includes a heating device (not illustrated) such as a band heater, and melts the resin introduced from a hopper 53. A screw 51*a* is integrated into the injection cylinder 51, and by rotation of the screw 51*a*, plasticizing and measuring the resin introduced into the injection cylinder 51 are performed, and by movement in the axial direction (Y-axis direction) of the screw 51*a*, it is possible to inject a molten resin from an injection nozzle 52.

A shut-off nozzle that opens/closes a discharge port can be used as the nozzle 52. However, any mechanism that would enable implementation of the nozzle 52 function is applicable. In FIG. 2, an example of a shut-off nozzle is illustrated. For an opening/closing mechanism 56, a pin 56*a* for opening/closing the discharge port 52*a* is arranged. The pin 56*a* is connected with an actuator (a cylinder) 56*c* via a link 56*b*, and by the operation of the actuator 56*c* the discharge port 52*a* is opened and closed.

The injection cylinder 51 is supported by a driving unit 54. In the driving unit 54, a motor for plasticizing and measuring the resin by rotationally driving the screw 51*a*, and a motor for driving the screw 51*a* to move forward/backward in the axial direction are arranged. The driving unit 54 can move forward/backward in the Y-axis direction along a rail 12 on the frame 10. And, in the driving unit 54, an actuator (for example, an electrically driven cylinder) 55 for causing the injecting apparatus 5 to move forward/backward in the Y-axis direction is arranged.

The clamping apparatus 6 performs a clamping and opening and closing of the molds 100A/100B. In the clamping apparatus 6, the following are arranged in order in the Y-axis direction: the fixed platen 61, a movable platen 62, and a movable platen 63. Through platens 61 to 63, a plurality of tie-bars 64 pass. Each of the tie-bars 64 is an axis that extends in the Y-axis direction, one end of which is fixed to the fixed platen 61. Each of the tie-bars 64 is inserted into a respective through hole formed in the movable platen 62. The other end of each of the tie-bars 64 is fixed to the movable platen 63 through an adjusting mechanism 67. The movable platens 62 and 63 can move in the Y-axis direction along a rail 13 on the frame 10, and the fixed platen 61 is fixed to the frame 10.

A toggle mechanism 65 is arranged between the movable platen 62 and the movable platen 63. The toggle mechanism 65 causes the movable platen 62 to move forward/backward in the Y-axis direction in relation to the movable platen 63 (in other words, in relation to the fixed platen 61). The toggle mechanism 65 includes links 65a to 65c. The link 65a is connected rotatably to the movable platen 62. The link 65b is pivotably connected to the movable platen 63. The link 65a and the link 65b are pivotably connected to each other. The link 65c and the link 65b are pivotably connected to each other. The link 65c is pivotably connected to an arm 66c.

The arm 66c is fixed on a ball nut 66b. The ball nut 66b engages a ball screw shaft 66a that extends in the Y-axis direction, and moves forward/backward in the Y-axis direction by rotation of the ball screw shaft 66a. The ball screw shaft 66a is supported such that it is free to rotate by the movable platen 63, and a motor 66 is supported by the movable platen 63. The motor 66 rotationally drives the ball screw shaft 66a while the rotation amount of the motor 66 is detected. Driving the motor 66 while detecting the rotation amount of the motor 66 enables clamping, opening, and closing of the mold 100A/100B.

The IMM2 includes sensors 68 for measuring a clamping force, where each sensor 68 is, for example, a strain gauge provided on the tie-bar 64, and calculates a clamping force by detecting a distortion of the tie-bar 64

The adjusting mechanism 67 includes nuts 67b supported to freely rotate on the movable platen 63, motors 67a as driving sources, and transfer mechanisms for transferring the driving force of the motors 67a to the nuts 67b. Each of the tie-bars 64 passes through a hole formed in the movable platen 63, and engages with the nut 67b. By causing the nuts 67b to rotate, the engagement positions in the Y-axis direction between the nuts 67b and the tie-bars 64 change. That is, the position at which the movable platen 63 is fixed in relation to the tie-bar 64 changes. With this, it is possible to cause a space between the movable platen 63 and the fixed platen 61 to change, and thereby it is possible to adjust a clamping force or the like.

The molding operation position 11 is a region between the fixed platen 61 and the movable platen 62.

The mold 100A/100B introduced into the molding operation position 11 are sandwiched between the fixed platen 61 and the movable platen 62 and thereby clamped. Opening and closing in based on movement of the movable mold 102 by movement of the movable platen 62 is performed.

FIG. 3 illustrates an opening portion 61a in a central portion of the fixed platen 61 through which the nozzle 52 moves forward/backward. To the surface on the side of the movable platen 62 (called an inner surface) of the fixed platen 61 a plurality of rollers BR are supported such that they are free to rotate. The plurality of rollers BR rotate around the axis of revolution in the Y-axis direction, and cause movement in the X-axis direction of the mold 100A/100B to be smooth, supporting the bottom surfaces (the bottom surface of the clamping plate 101a) of the mold 100A/100B and supporting the mold 100A/100B from below. On both sides in the X-axis direction of the fixed platen 61, a roller supporting body 620 is fixed, and the plurality of rollers BR are supported by the roller supporting body 620.

On the inner surface of the fixed platen 61, grooves 61b that extend in the X-axis direction are formed.

The grooves 61b are formed in two rows separated vertically. On each of the grooves 61b a roller unit 640 is arranged. For the roller unit 640, a plurality of rollers SR are supported such that they are free to rotate. The plurality of rollers SR rotate around the axis of revolution in the Z-axis direction, and guide movement in the X-axis direction of the mold 100A/100B contacting the outer surfaces of the mold 100A/100B (the outer surface of the clamping plate 101a) and supporting the mold 100A/100B from the side. As illustrated in the cross sectional view of the line II-II, while the roller unit 640, by a bias of a spring 641, is positioned at a position at which the roller SR protrudes from the groove 61b, at a time of clamping it is retracted in the groove 61b, and positioned at a position at which the roller SR does not protrude from the groove 61b. The roller unit 640 can prevent the inner surfaces of the mold 100A/100B and the fixed platen 61 from contacting and damaging the inner surfaces at a time of alternating the mold 100A/100B, and the roller unit 640 does not impede the inner surface of the fixed platen 61 and the mold 100A/100B being closed at a time of clamping.

On both sides in the X-axis direction of the fixed platen 61, a roller supporting body 630 is fixed, and multiple rollers SR are supported by the roller supporting body 630.

On the fixed platen 61, a plurality of fixing mechanisms (clamps) 610 are arranged for fixing the fixed mold 101 to the fixed platen 61. Each fixing mechanism 610 includes an engaging portion 610a that engages with the clamping plate 101a, and a built-in actuator (not illustrated) that moves the engaging portion 610a between an engagement position and an engagement release position.

Note that for the movable platen 62, similarly to the fixed platen 61, a plurality of rollers BR, the roller supporting bodies 620 and 630, the roller unit 640, and the fixing mechanism 610 for fixing the movable mold 102 are arranged.

As illustrated in FIG. 4, the periphery of the clamping apparatus 6 is surrounded by a cover (exterior covering plate) 60 for safety, but openings 60B through which the mold 100A/100B pass is formed on the sides of the molding operation position 11 for alternating the mold 100A/100B. Each opening 60B is typically continuously open, enabling free removal and insertion of the mold 100A/100B from and to the molding operation position 11.

Returning to FIG. 2, the take-out robot 7 will now be described. The take-out robot 7 includes a rail 71 that extends in the X-axis direction, and a movable rail 72 that can move in the X-axis direction on the rail 71. The movable rail 72 is arranged to extend in the Y-axis direction, and a slider 73 is arranged on the movable rail 72. The slider 73 moves in the Y-axis direction guided by the movable rail 72, and moves up and down an elevating shaft 73a in the Z-axis direction. On a lower end of the elevating shaft 73a, a vacuum head 74 is arranged, and on the vacuum head 74, a chuck plate 75 specialized to a molded part is mounted.

The take-out robot 7, after opening, moves the vacuum head 74 between the stationary mold 101 and the movable mold 102 as illustrated by broken lines in FIG. 2 by the rail 71, the movable rail 7, and the slider 73, sticks to the molded part, and conveys it outside the mold 100A/100B.

Figure 5:
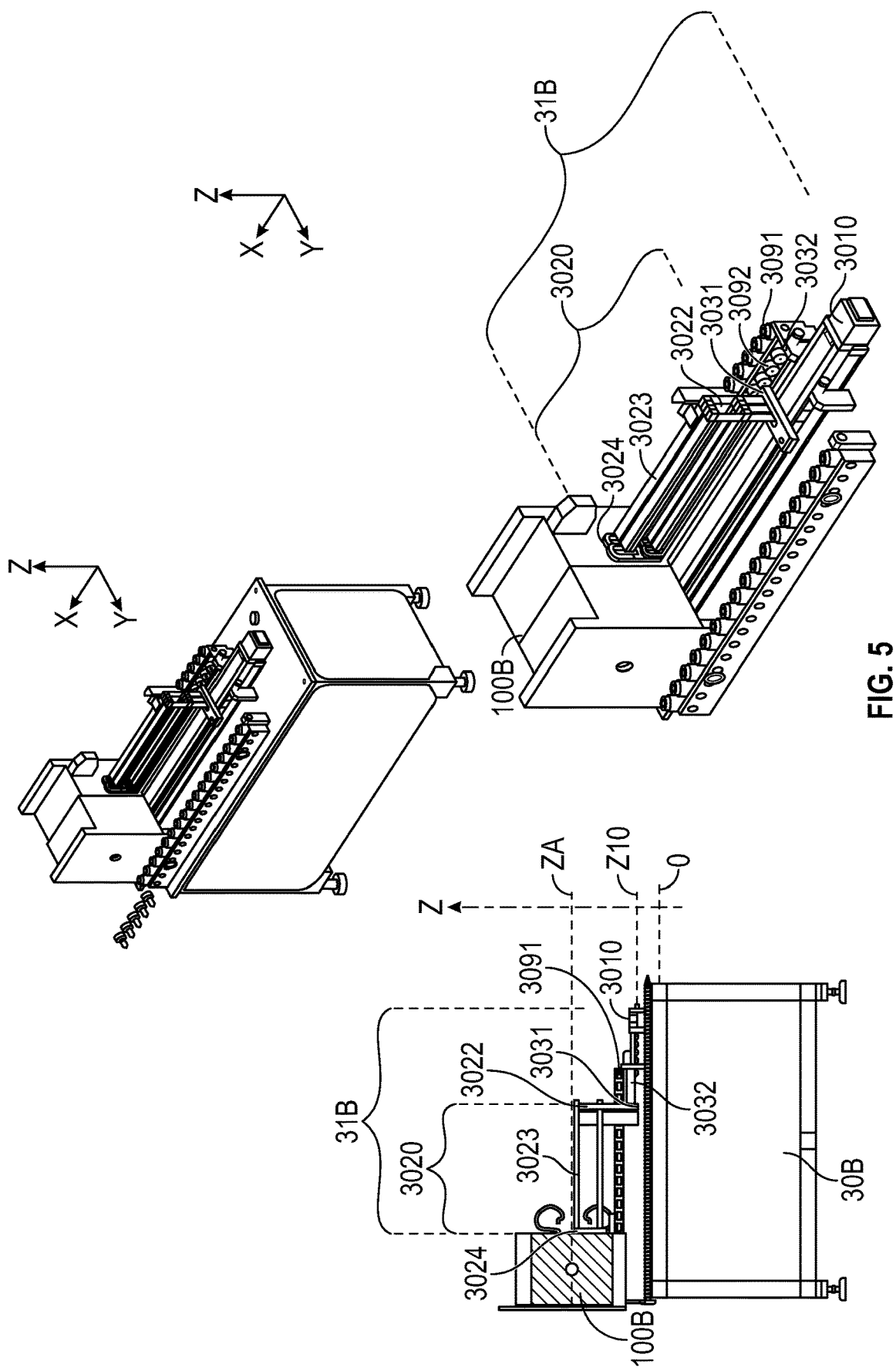
FIG. 5 is a side view of a conveyor device where a mold is moved by driving an actuator.

FIG. 5 is a side view of the conveyor device 3B, where the mold 100B is moved by drive of actuator 3010.

Moving a slide 3032 for an actuator 3010 enables the mold 100B that is linked to the slide 3032, a plate 3031 and a linked unit 3020 to become movable. The actuator 3010 and the frame 30B do not move based on the movement of the mold 100B since the actuator 3010 is fixed to the frame 30B. The mold 100B moves in relation to the actuator 3010 and the frame 30B.

FIG. 5 illustrates a configuration of the linked unit 3020 that is located between the mold 100B and the actuator 3010. The linked unit 3020 includes a base plate 3024 that attaches to the mold 100B, four linked brackets 3023, two shafts 3022 that have cam followers (not illustrated) on their tips, and a base plate 3031 with a slot that is attached to the slider 3032. The mold 100B and actuator 3010 are linked by inserting the cam follower 3021 into the base plate 3031 with a slot.

The following discussion is directed to the situation where the mold 100B moves along the X-axis direction, and when the actuator's 3010 Y-axis direction center position and the mold 100B's Y-axis direction center position are misaligned in the Y-axis direction. More specifically, what is discussed is when the mold 100B is misaligned in the center position of the Y-axis direction against the actuator 3010 center position of the Y-axis direction due to movement of the mold 100B.

If the mold 100B and the actuator 3010 position are misaligned in the Y-axis direction when moving the mold 100B, slippage of the cam follower 3021 with slippage of the linked bracket 3023 moving along the inserted slot of the base plate 3031 in the Y-axis direction can result in absorption of the load of the misalignment in the Y-axis direction of the actuator 3010 and the mold 100B. That is, the Y-axis direction movement of the mold 100B results in the cam follower 3021 roller rotating, which can reduce the load to the actuator 3010 and the linked unit 3020. The greater the misalignment to the Y-axis direction of the mold 100B and the actuator 3010, the greater the load to the linked parts and the actuator 3010. Thus, by reducing the shift in the Y-axis direction, the load can be reduced or eliminated.

Without the linked unit 3020 mechanism, and if simply linked, the center of the Y-axis direction for the mold 100B can misalign to the center of the Y-axis direction for the actuator 3010. This can result in the weight of the mold 100B and the load from the amount of the movement portion in the Y-axis direction being applied to the actuator 3010 and the linked section. Thus, the linked section can warp in the Y-axis direction, and additional load can also be applied to the actuator 3010 in the Y-axis direction. By forming the linked unit 3020 as illustrated in FIG. 5, the cam follower 3021 is movable in the Y-axis direction against the base plate 3031, and the load from the mold 100B shifting in the Y-axis direction will be reduced or eliminated for the linked unit 3020 and the actuator 3010.

FIG. 5 also illustrates a center position of the Z-axis direction for the actuator 3010 to Z10 and a center position of the Z-axis direction for mold 100B to ZA. As illustrated in FIG. 5, the origin for the Z-axis direction is the surface of frame 30B. Actuator 3010 is fixed to frame 30B, so if the center of the Z-axis direction for actuator 3010 is Z10 (datum position), and the center of the Z-axis direction for the mold 100B is ZA (datum position), the actuator 3010 and the mold 100B are not misaligned in the Z-axis direction.

The following discussion is directed to the situation where the mold 100B moves in the X-axis direction, and if the center of the Z-axis direction of the mold 100B misaligns in the Z-axis direction from ZA. When the mold 100B moves, and if the datum position of the Z-axis direction for the actuator 3010 and the datum position of the Z-axis direction for the mold 100B changes, i.e., the center position of the Z-axis direction for the mold 100B misaligns in the Z-axis direction, the cam follower 3021 of the linked bracket 23 inserted into the slot of the base plate 3031 will move along the slot in the Z-axis direction. As a result, the load from misalignment to the Z-axis direction of the mold 100B and the actuator 3010 can be absorbed. The cam follower 3021 can move in the Z-axis direction of the slot. This enables the load applied to the actuator 3010 and the linked section to be reduced or eliminated.

Without the linked unit 3020 mechanism, and if simply linked, the center of the Z-axis direction for the mold 100B can misalign in the Z-axis direction from ZA. This can result in the weight of the mold 100B and the load from the amount of the movement portion in the Z-axis direction being applied to the actuator 3010 and the linked section. Thus, the linked section can warp in the Z-axis direction, and additional load can also be applied to the actuator 3010 in the Z-axis direction. By forming the linked unit 3020 as illustrated in FIG. 5, the cam follower 3021 is movable in the Z-axis direction, and the load from the mold 100B shifting in the Y-axis direction can be reduced or eliminated for the linked unit 3020 and the actuator 3010.

The above-described the exemplary embodiment is configured with two cam followers 3021 and a slot on the base plate 3031. This enables a reduction of the load to the misalignment in the Z-axis direction, and the Y-axis direction of the mold 100B and the actuator 3010. The can prevent application of excess load/reduction in load to the actuator 3010, and reduce the possibility of damage to the linked unit 3020. Preventing damage to the actuator 3010 enables selection of a larger actuator that can handle greater loads, which can result in overall cost reduction. The above-described configuration eliminates the need for excessive position adjustment for the frame 30B or excessive position accuracy of the side surface guide roller 3091, the bottom surface guide roller 3092 to the IMM2, and enables a reduction in cost by easing machine parts precision and/or a reduction in man-hours during assembly.

The shape of the cam follower 3021 can be, for example, a round shape without a rotating mechanism or a square shape and enables the cam follower 3021 to move with a low friction coefficient against the inside surface inside of the slotted hole. While four linked brackets 3023 have been illustrated in the exemplary embodiment, other shapes that would enable practice of the exemplary embodiment are applicable. In another exemplary embodiment, one or more shafts 3022 and cam followers 3021 can be used, where a shape with a dimension that enables the cam follower 3021 and the slot of the base plate 3031 to overlap.

Figure 6:
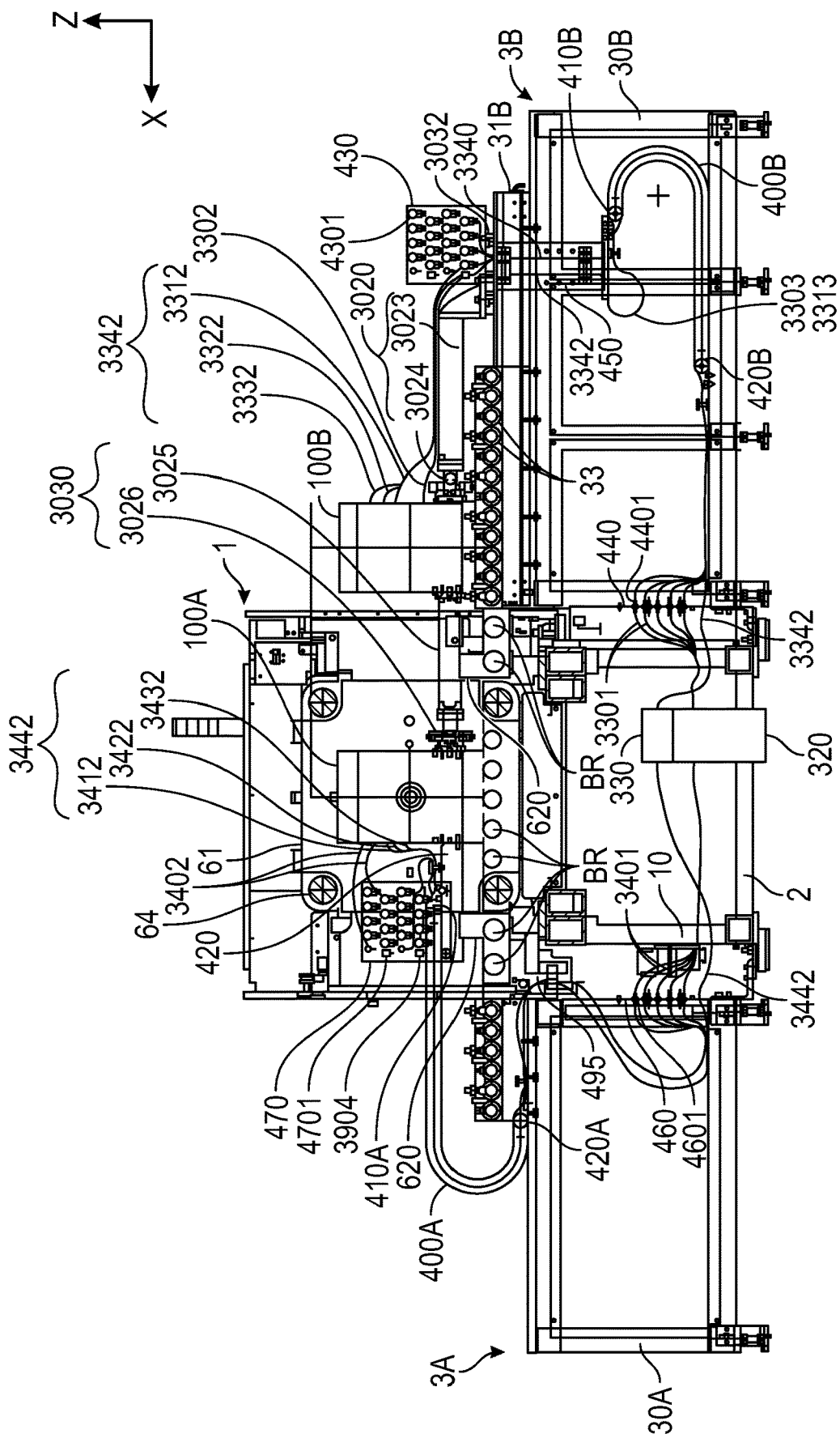
FIG. 6 illustrates a cross-section viewing the injection molding system from the Y-axis direction.

The routing configuration of the cables connected to the mold 100A/100B will be discussed. FIG. 6 illustrates a cross-section viewing the injection molding system 1 from the Y-axis direction.

The mold 100A is located at the molding operation position 11 in the IMM2. The mold 100A is positioned on the rollers BR installed on the fixed platen 61 and the movable platen 62. The mold 100A is linked to the mold 100B by the linked unit 3030, and moves in the same direction as the mold 100B when the mold 100B moves in the X-axis direction. The linked unit 3030 includes the linked bracket 3025 fixed to the mold 100B and the base plate 3026 fixed to the mold 100A. The mold 100A moves from the molding operation position 11 in the direction of the conveyor device 3A. After it arrives at the conveyor device 3A, it moves along the top panel of the frame 30A.

A mounting stay 490, which is made of metal, is installed on the mold 100A on the side opposite that of the side to which the linked unit 3030 is connected in the X-axis direction. A manifold 470 and one end portion 410A of a cable carrier 400A are fixed to the mounting stay 490. Another end portion 420A of the cable carrier 400A is fixed to the top panel of the frame 30A of the conveyor device 3A. In other words, both the end portion 410A and the end portion 420A of the cable carrier 400A are located above the top panel of the frame 30A. The cable carrier 400A is a component that covers each type of cable, described below, and that regulates (guides) movement of a respective cable. Cooling tubes for temperature control, a heater required for temperature control/operation of a hot runner, thermocouples and air tubes are located inside the mold 100A. The cooling tubes inside the mold 100A are connected to the temperature control hose 3402.

Figure 7:
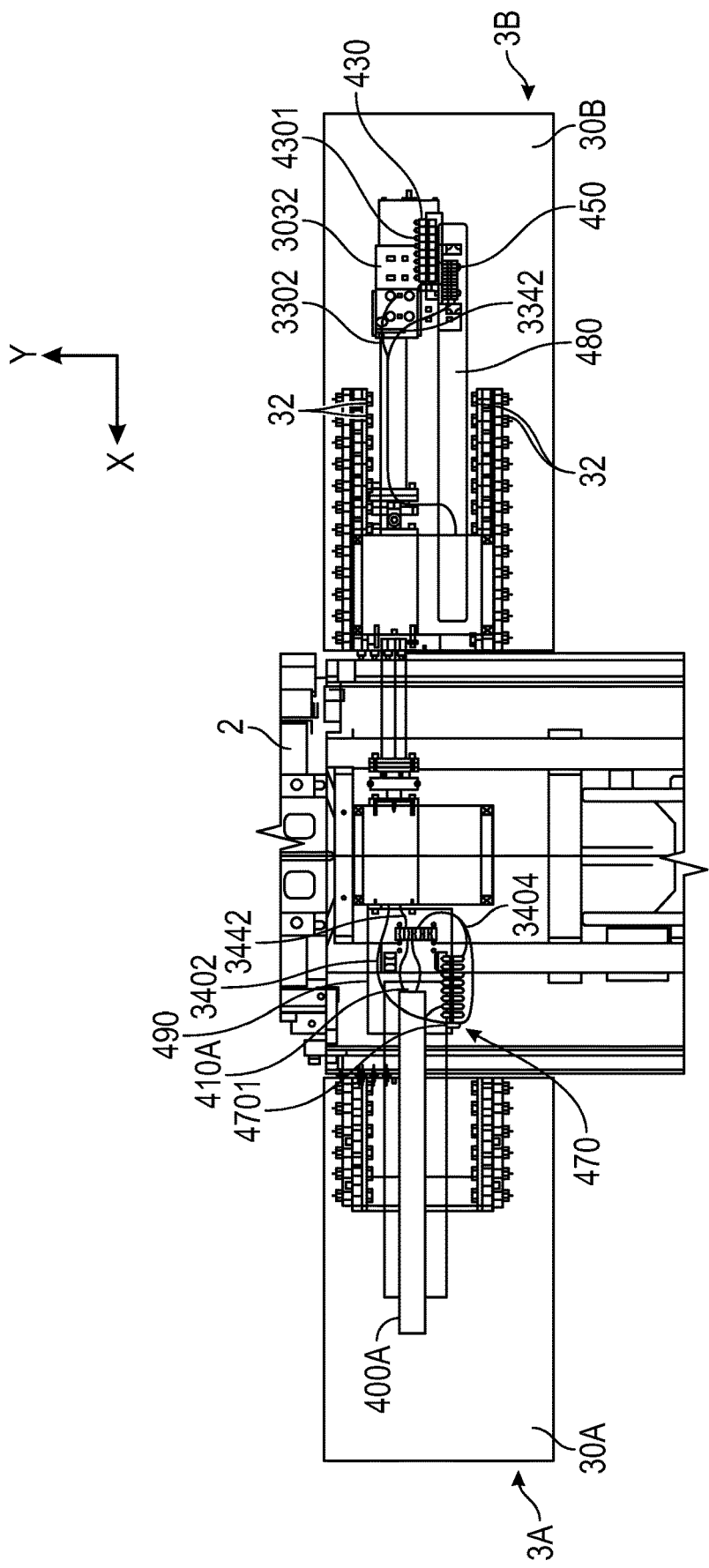
FIG. 7 is a top view of the cross-section illustrated in FIG. 6.

FIG. 7 is a top view of FIG. 6, and illustrates an enlargement of the IMM2 and the conveyor devices 3A and 3B. The temperature control hose 3402, extending from the cooling tube, is connected along the Y-axis direction against a coupler 4701, which is installed in the manifold 470. The coupler 4701 includes an entry point and an exit point, where the exit point is connected to the temperature control hose 3404. The temperature control hose 3404 enters into the end portion 410A of the cable carrier 400A. The temperature control hose 3404 is guided by the cable carrier 400A, and exits from the end portion 420A of the cable carrier 400A.

As illustrated in FIG. 6, the cable carrier 400A is bent with a curvature sufficiently larger than the smallest radius curvature of the temperature control hose 3404. The smallest radius curvature refers to the smallest possible curvature radius that will enable fluid inside the temperature control hose 3404 to smoothly flow without the temperature control hose 3404 breaking, and changes depending on the material of the temperature control hose 3404 or the radius of the temperature control hose's 3404 cross section. The section of the temperature control hose 3404 that exits via the end portion 420A of the cable carrier 400A passes through the top panel of the frame 30A, and proceeds to the bottom of the top panel of the frame 30A via the gap 495 formed in the IMM2. The section of the temperature control hose 3404 located at the bottom of the top panel of the frame 30A connects, along the X-axis direction, with a coupler 4601 installed in the manifold 460. The coupler 4601 includes an entry point and an exit point, where the exit point is connected to the temperature control hose 3401. The temperature control hose 3401 is connected to a temperature controller 320, which is installed in the lower part of the IMM2. The temperature controller 320 adjusts the temperature of cooling water that flows inside of the temperature control hose 3404, and also pumps the cooling water into the mold 100A.

The heater inside of the mold 100A is connected to a heater cable 3412 via a heater connector. The thermocouple is connected to a thermocouple cable 3422 via a thermocouple connector. The air tube is connected to an air hose 3432. The heater cable 3412, the thermocouple cable 3422, and the air hose 3432 are bundled together with a cable net, tie-wrap, and a strap, and comprise the hot runner cable 3442. As illustrated in FIG. 7, the hot runner cable 3442 enters the end portion 410A of the cable carrier 400A. The hot runner cable 3442 is guided by the cable carrier 400A and exits from the end portion 420A of the cable carrier 400A.

As illustrated in FIG. 6, the cable carrier 400A is bent with a curvature sufficiently larger than the smallest radius curvature of the hot runner cable 3442. The section of the hot runner cable 3442 that exits from the end portion 420A of the cable carrier 400A passes through the top panel of the frame 30A, and proceeds to the bottom of the top panel of the frame 30A via the gap 495 formed in the IMM2. The section of the hot runner cable 3442 located at the bottom of the top panel of the frame 30A is connected to a hot runner controller 330 installed in the lower part of the IMM2. The hot runner controller 330 adjusts the temperature of the heater and monitors the temperature with a thermocouple.

The mold 100B is located on the conveyor device 3B and sits on top of the multiple rollers 33 that are installed on the conveyor device 3B. The mold 100B is connected to the slide 3032 by the linked unit 3020. The linked unit 3020 is connected to the slide 3032. As illustrated in FIG. 5, the slide 3032 is connected to the actuator 3010, thus, the mold 100B is connected to the actuator 3010. A manifold 430 and a guiding component 450 are connected to the slide 3032.

As illustrated in FIG. 7, the guiding component 450 is cylindrical cables are guided by the guiding component 450 to below the top panel of the frame 30B. The end portion 420B of the cable carrier 400B is fixed to the bottom panel of the frame 30B of the conveyor device 3B. The end portion 410B of the cable carrier 400B is fixed to the side of the guiding component 450 opposite the side where the frame 30B is located. In other words, the end portion 410B and the end portion 420B of the cable carrier 400B are located below the top panel of the frame 30B. Cooling tubes for temperature control, a heater required for temperature control/operation of a hot runner, thermocouples and air tubes are located inside the mold 100B. The cooling tubes inside the mold 100B are connected to the temperature control hose 3302.

Figure 8:
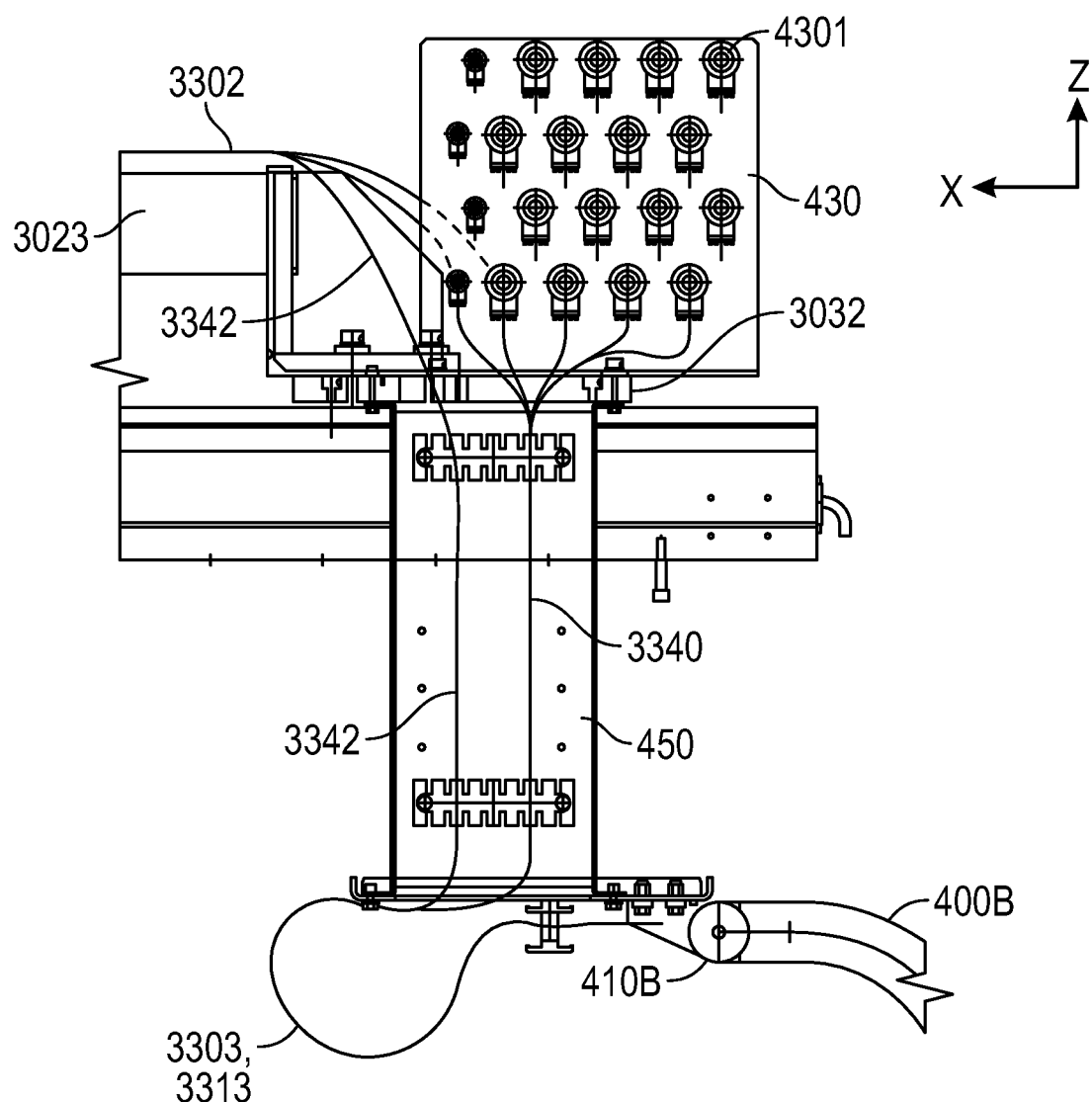
FIG. 8 illustrates an enlarged view of a manifold and a guiding component.

As illustrated in FIG. 7, the temperature control hose 3302, extending from the cooling tube, is connected along the Y-axis direction at the coupler 4301, which is installed on the manifold 430. The coupler 4301 includes and entry point and an exit point, where the exit point is connected to the temperature control hose 3340. As illustrated in FIG. 7, a slit 480 is formed in the top panel of the frame 30B of the conveyor device 3B, and the configuration is such that the guiding component 450 can move in the X-axis direction based on driving of the actuator 311. FIG. 8 illustrates an enlarged view of the manifold 430 and the guiding component 450.

The temperature control hose 3340 is fixed to the guiding component 450 with a tie-wrap or a strap. The end portion 410B of the cable carrier 400B is fixed to the other side of the guiding component 450. After the temperature control hose 3340 has been guided by the guiding component 450, it is secured with a structure drawing a circle 3303 that has a radius larger than the smallest radius curvature of the temperature control hose 3340. The temperature control hose 3340 enters the end portion 410B of the cable carrier 400B.

In FIG. 6, the temperature control hose 3340 is guided by the cable carrier 400B, and exits from the end portion 420B of the cable carrier 400B. The cable carrier 400B is bent with a curvature that is sufficiently larger than the smallest radius curvature of the temperature control hose 3340. The section of the temperature control hose 3340 that exits from the end portion 420B of the cable carrier 400B connects, along the X-axis direction, with a coupler 4401 that is installed on the manifold 440. The coupler 4401 includes an entry point and an exit point, where the exit point is connected to temperature control hose 3301. The temperature control hose 3301 is connected to the temperature controller 320 that is installed in the lower part of the IMM2.

The heater inside the mold 100B is connected to a heater cable 3312 via a heater connector. The thermocouple is connected to a thermocouple cable 3322 via a thermocouple connector. The air tube is connected to an air hose 3332. The heater cable 3312, the thermocouple cable 3322, and the air hose 3332, are bundled by a cable net, tie-wrap and strap, and comprise a hot runner cable 3342. The hot runner cable 3342 is fixed to the linked bracket 3023 with a tie-wrap or a strap, and is guided by the guiding component 450. The hot runner cable 3342 is fixed to the guiding component 450 with a tie-wrap or a strap. After the hot runner cable 3342 has been guided by the guiding component 450, it is secured with a structure drawing a circle 3313 that has a radius larger than the smallest radius curvature of the hot runner cable 3342. The hot runner cable 3342 enters the end portion 410B of the cable carrier 400B. The hot runner cable 3342 is guided by the cable carrier 400B, and exits from the end portion 420B of the cable carrier 400B. The cable carrier 400B is bent with a curvature that is sufficiently larger than the smallest radius curvature of the hot runner cable 3342. The section of the hot runner cable 3342 that exits the end portion 420B of the cable carrier 400B is connected to the hot runner controller 330 attached to the bottom panel of the frame 30B.

Figure 9:
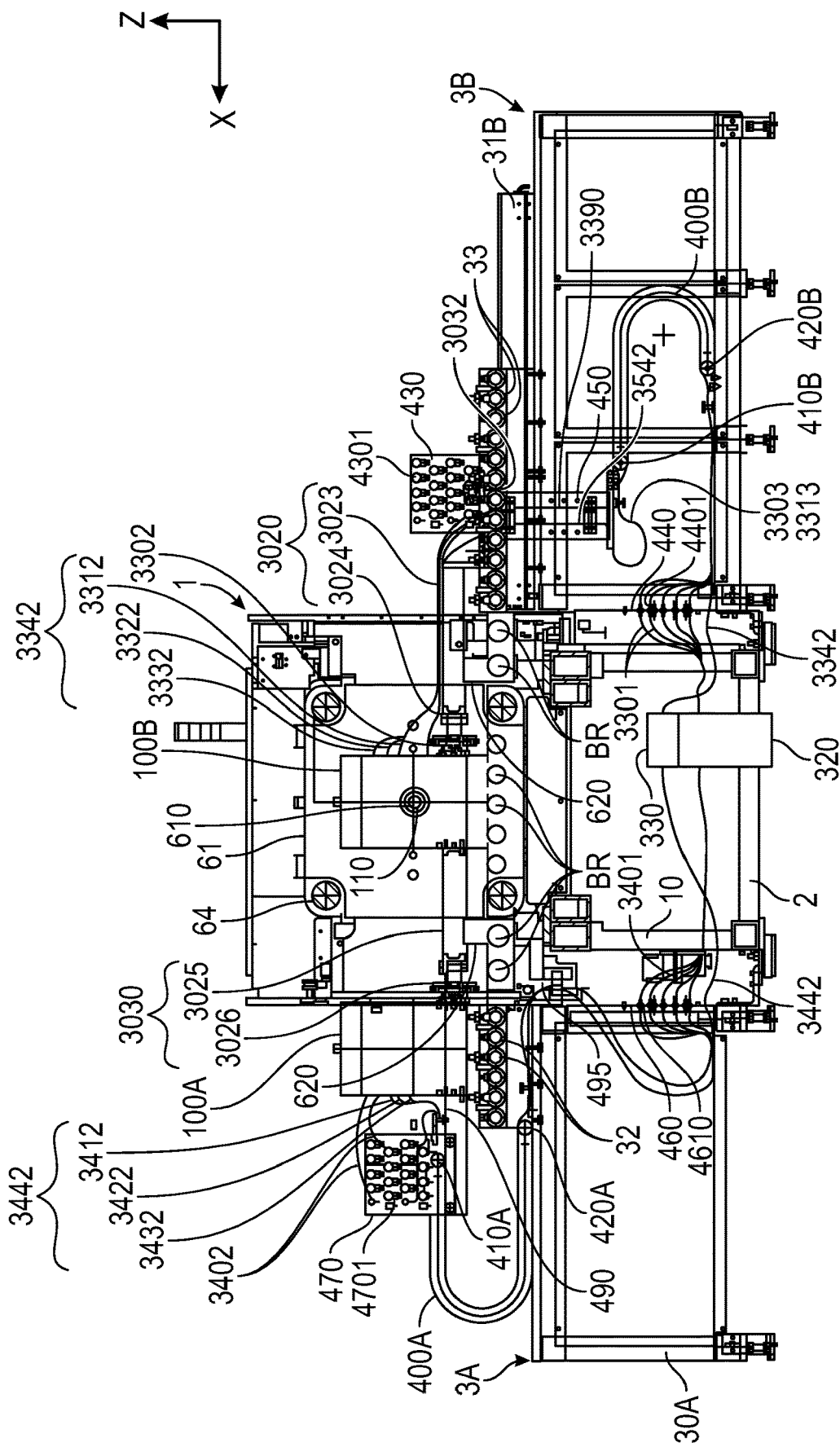
FIG. 9 illustrates where a mold has finished moving from the injection molding machine to a conveyor device and another mold has finished moving from another conveyor device to the injection molding machine by driving an actuator from the situation illustrated in FIG. 6.

FIG. 9 illustrates where the mold 100A has finished moving from the IMM2 to the conveyor device 3A and the mold 100B has finished moving from the conveyor device 3B to the IMM2 by driving the actuator 3010 from the situation illustrated in FIG. 6. The mold 100B moves on the rollers 33 that are installed on the conveyor device 3B. When moving to the fixed platen 61 and the movable platen 62, which are installed in the IMM2, from the conveyor device 3B, the mold 100B passes over the roller BR on top of the roller supporting body 620. Movement of the mold 100B completes when the mold 100B is in the position (molding operation position 11) where the center 100 of the mold 100B is aligned with the center 610 of the fixed platen 61. The mold 100A passes over the roller BR on top of the roller supporting body 620. When moving from the platen 61 to the conveyor device 3A, the mold 100A passes over the roller BR on top of the roller supporting body 620 installed on the fixed platen 61, and over the roller 33 installed in the conveyor device 3A. Movement of the mold 100A stops at the same time that movement of the mold 100B stops.

The manifold 470, which is fixed on the mounting stay 490, and the end portion 410A of the cable carrier 400A also move in the same direction that the mold 100A is moved by the actuator 3010. The relative positional relationship of the mold 100A and the manifold 470, and the end portion 410A of the cable carrier 400A do not change. In other words, the length of each of the cables between the mold 100A and the manifold 470, and the end portion 410A of the cable carrier 400A does not change. Since the end portion 420A of the cable carrier 400A is fixed to the top panel of the frame 30A, the length of the cables between the end portion 420A of the cable carrier 400A and the temperature controller 320, and the hot runner controller 330 does not change. The shapes of the cables can change because each type of cable is guided by the cable carrier 400A to accompany the movement of the mold 100A. Since the end portion 410A is fixed to the mounting stay 490 and the end portion 420A is fixed to the top panel of the frame 30A, the length of each cable is adjusted by a loop formed in the X-axis direction of the cable carrier 400A becoming larger or smaller.

The manifold 430 and the guiding component 450, which are fixed on the slide 3032, also move in the same direction the mold 100B is moved by the actuator 3010. The relative positional relationship of the mold 100B and the manifold 430, and the guiding component 450 does not change. In other words, the length of each type of cable between the mold 100B and the manifold 430, and the guiding component 450 does not change. Since the end portion 410B of the cable carrier 400B is connected to the guiding component 450, the length of each type of cable between the mold 100B and the one end portion 410B of the cable carrier 400B does not change. In addition, since the end portion 420B of the cable carrier 400B is fixed to the bottom panel of the frame 30B, the length of each type of cable between the end portion 420B of the cable carrier 400B and the temperature controller 320, and the hot runner controller 330 does not change. Since the cable carrier 400B guides each type of cable to accompany the movement of the mold 100B, the shapes of the cables do change. Since the end portion 410B is fixed to the guiding component 450, and the end portion 420A is fixed to the bottom panel of the frame 30B, the length of each type of cable is adjusted by a loop formed in the X-axis direction of the cable carrier 400B becoming larger or smaller.

Based on the above-described configuration, the cable carrier 400A/400B operates together with the movement of the mold 100A/100B. Since the movement of multiple cables extending from the mold 100A/100B are respectively controlled by the cable carrier 400A/400B, the possibility that any cables obstruct the movement of the mold 100A/100B is reduced. In addition, since the end portion 410B and the end portion 420B of the cable carrier 400B are located below the top panel of the frame 30B along which the mold 100B moves, the possibility that any cables obstruct the movement of the mold 100B is further reduced.

According to the above-described exemplary embodiment, the temperature controller 320 and the hot runner controller 330 are installed in the lower part of the IMM2. However, this configuration is not seen to be limiting. In another exemplary embodiment, the temperature controller 320 and the hot runner controller 330 can be installed in the lower part of the frame 30A or the lower part of frame 30B. In another exemplary embodiment, the temperature controller 320 and hot runner controller 330 can be installed external to the IMM2, frame 30A, or frame 30B. In still yet another exemplary embodiment, the instead of utilizing a single/common temperature controller 320 and a single/common hot runner controller 330 with the conveyance device 3A and the conveyance device 3B, each conveyance device can utilize its own unique temperature controller and hot runner controller. In still yet one more exemplary embodiment, an air hose can be connected to an air circuit separately installed in the IMM2 for temperature control/ operation of a hot runner instead of the hot runner controller 330.

According to the above-described exemplary embodiment, the temperature control hose of the present embodiment is divided into three temperature control hoses (3302, 3340, and 3301) via the manifold 430 and the manifold 440. Heater cable 3312, thermocouple cable 3322, and air hose 3332, however, are not routed via the manifolds 430 and 440. The configuration of the temperature control hose is different from the configuration of other cables and hoses because the frequency at which a temperature control hose is typically exchanged is higher, and the task of exchanging becomes easier with there being three separate temperature control hoses. However, this configuration is not seen to be limiting, and other types of cables can be constructed by routing them via the manifold 430 or the manifold 440. In another exemplary embodiment, a temperature control hose can be directly connected to the cable carrier 400B.

The manifold 430 is arranged such that it is parallel to the XZ-plane and the manifold 440 is arranged such that it is parallel to the YZ-plane in order to prevent interference with the rollers 32 when the manifold 430 moves in the X-axis direction. However, this configuration is not seen to be limiting, e.g., in the situation where the size of the manifold 430 is small.

Figure 10:
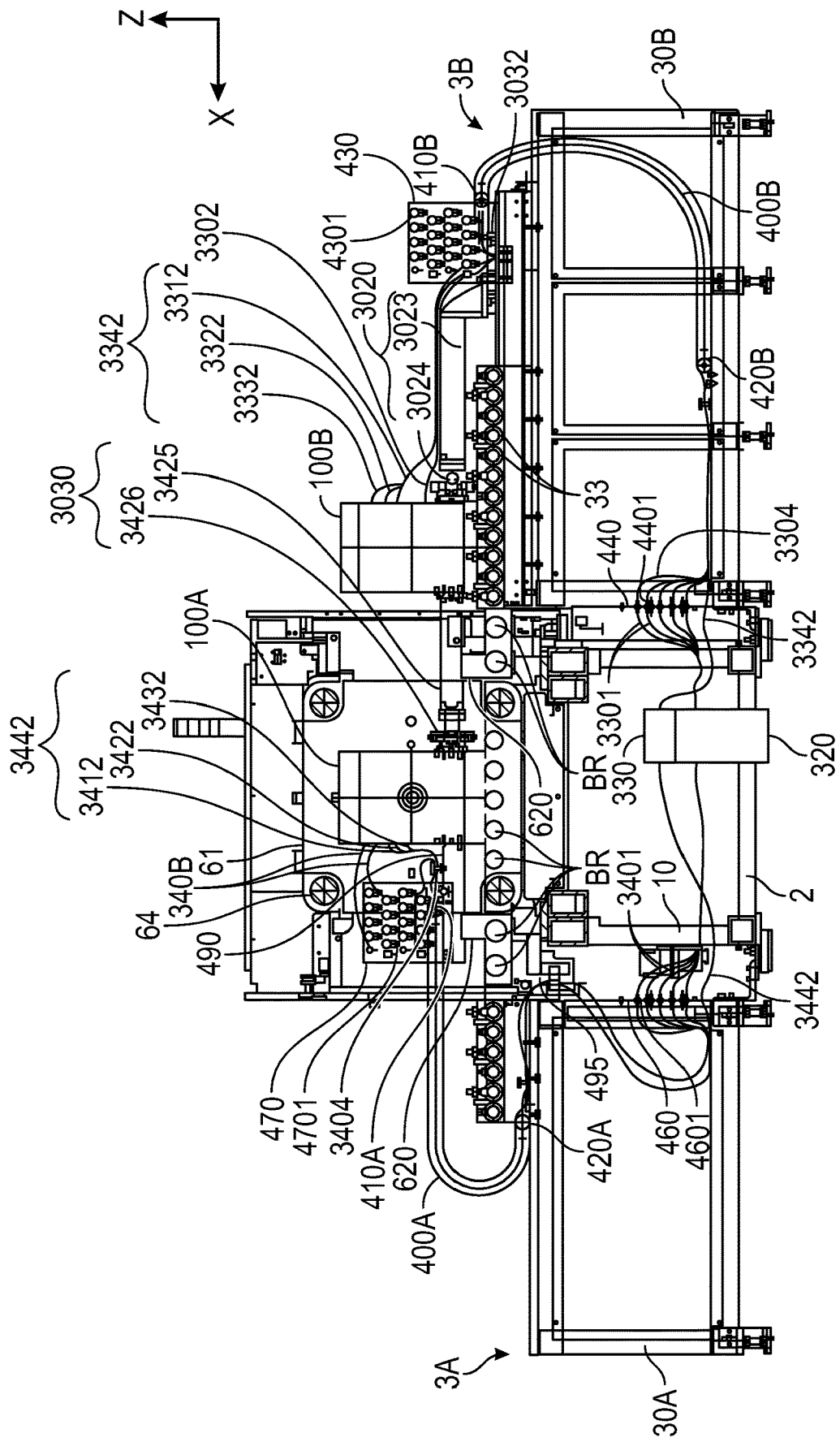
FIG. 10 illustrates a cross section viewing the injection molding system from the Y-axis direction.

FIG. 10 illustrates a cross section viewing the injection molding system 1 from the Y-axis direction according to another exemplary embodiment. In the present embodiment, as illustrated in FIG. 10, the routing configuration of the cables on the conveyor device 30A side is the same as the previously described exemplary embodiment illustrated in FIG. 6. In the present exemplary embodiment, the difference is the routing configuration of the cables on the conveyor device 30B side.

The mold 100B is located on the conveyor device 3B, and sits on top of the multiple rollers 33 that are installed on the conveyor device 3B. The mold 100B is connected to the slide 3032 by the linked unit 3020. As illustrated in FIG. 5, the slide 3032 is connected to the actuator 3010, thus the mold 100B is connected to the actuator 3010. The manifold 430 and the end portion 410B of the cable carrier 400B are connected to the slide 3032. In the present embodiment, a guiding component is not provided, and the configuration is such that the end portion 420B of the cable carrier 400B is directly connected to the slide 3032. The end portion 420B of the cable carrier 400B is fixed on the bottom panel of the frame 30B of the conveyor device 3B. In other words, the end portion 410B of the cable carrier 400B is located above the top panel of the frame 30B, and the end portion 420B is located below the top panel of the frame 30B.

A cooling tube for temperature control, a heater for temperature control/operation of a hot runner, a thermocouple, and an air tube are located inside the mold 100B. The cooling tube is connected to the temperature control hose 3302. The section of the temperature control hose 3302 that extends from the cooling tube is connected to the coupler 4301 installed on the manifold 430. The coupler 4301 is equipped with an entry point and an exit point, and the exit point is connected to the temperature control hose 3304. The temperature control hose 3304 enters the end portion 410B of the cable carrier 400B. The temperature control hose 3304 is guided by the cable carrier 400B, and exits the end portion 420B of the cable carrier 400B. The cable carrier 400B is bent with a curvature sufficiently larger than the smallest curvature radius of the temperature control hose 3304. The section of the temperature control hose 3304 that exists the end portion 420B of the cable carrier 400B is connected to the coupler 4401, which is installed on the manifold 440. The coupler 4401 includes an entry point and an exit point, where the exit point is connected to the temperature control hose 3301. The temperature control hose 3301 is connected to the temperature controller 320 installed in the lower part of the IMM2.

The heater inside the mold 100B is connected to the heater cable 3312 via a heater connector. The thermocouple is connected to the thermocouple cable 3322 via a thermocouple connector. The air tube is connected to the air hose 3332. The heater cable 3312, the thermocouple cable 3322, and the air hose 3332 are bundled by a cable net, a tie-wrap and a strap, and comprise the hot runner cable 3342. The hot runner cable 3342 is fixed to the linked bracket 3023 with a tie-wrap or a strap, and enters the end portion 410B of the cable carrier 400B. The hot runner cable 3342 is guided by the cable carrier 400B, and exits from the end portion 420B of the cable carrier 400B. The cable carrier 400B is bent with a curvature sufficiently larger than the smallest curvature radius of the hot runner cable 3342. The section of the hot runner cable 3342 that exits the end portion 420B of the cable carrier 400B is connected to the hot runner controller 330 attached to the bottom panel of the frame 30B.

Figure 11:
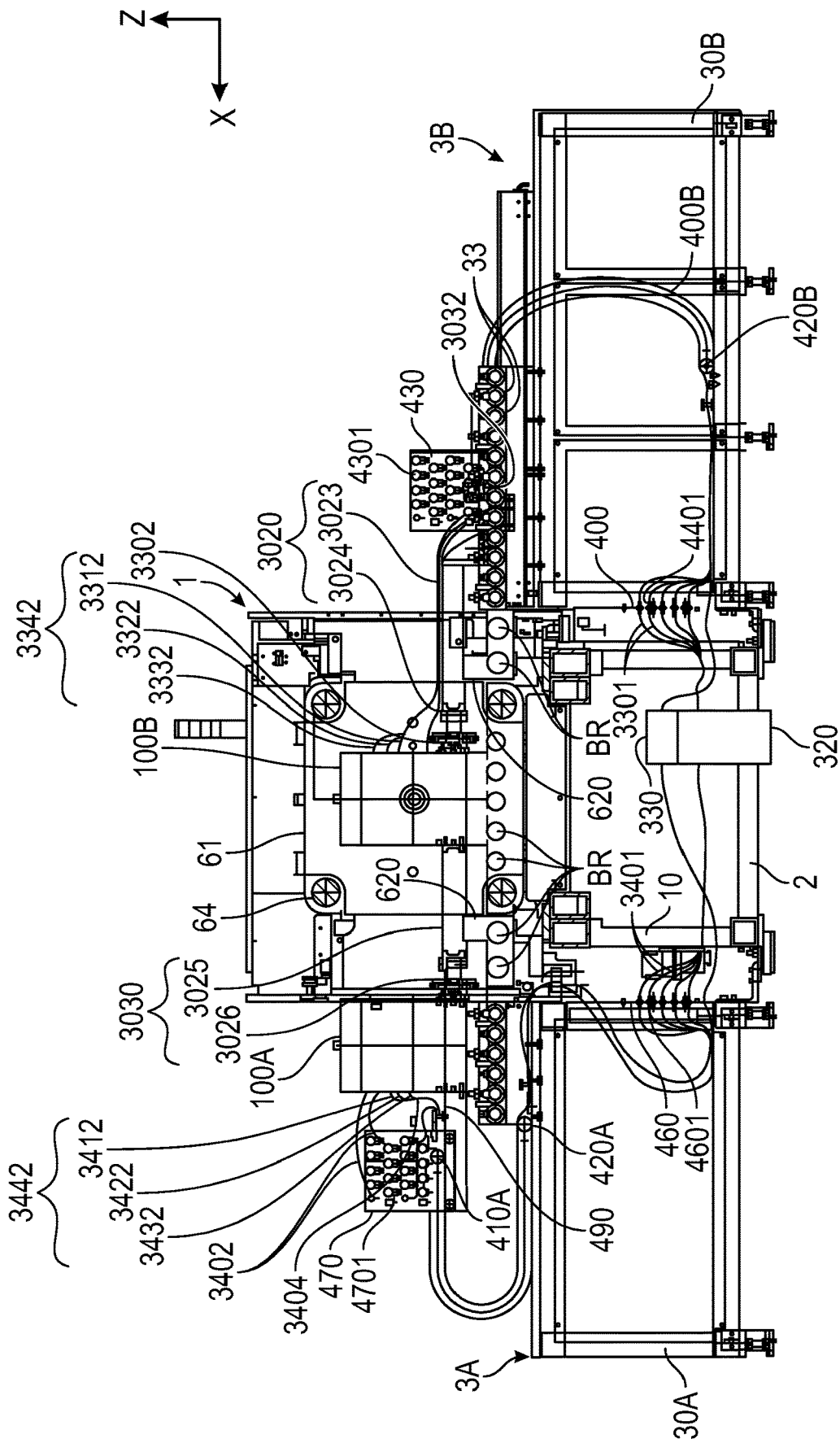
FIG. 11 illustrates movement completion of a mold from the injection molding machine to a conveyor device and of a different mold from a different conveyor device to the injection molding machine by driving an actuator from the location in FIG. 10.

FIG. 11 illustrates movement completion of the mold 100A from the IMM2 to the conveyor device 3A and of the mold 100B from the conveyor device 3B to the IMM2 by driving of the actuator 3010 from the location in FIG. 10.

The mold 100B moves on the rollers 33 that are installed on the conveyor device 3B. When moving from the conveyor device 3B to the fixed platen 61, which is installed in the IMM2, the mold 100B passes over the roller BR on top of the roller supporting body 620 installed on the fixed platen 61, and it passes over the roller BR installed on the platen 61. In the end, the movement of the mold 100B completes in the position (molding operation position 11) where the center 110 of the mold 100B matches the center 610 of the fixed machine platen 61. The mold 100A moves over the roller BR installed on the fixed platen 61. When moving from the fixed platen 61 to the conveyor device 3A, the mold 100A passes over the roller BR on the roller supporting body 620 that is installed on the fixed platen 61, and passes over the roller 33 that is installed on the conveyor device 3A. The mold 100A stops moving when the mold 100B stops moving.

The manifold 430, which is fixed to the slide 3032, and the end portion 410B of the cable carrier 400B also move in the same direction the mold 100B is moved by the actuator 3010. The relative positional relationship of the mold 100B and the manifold 430, and the end portion 420B of the cable carrier 400B does not change. In other words, the length of each type of cable between the mold 100B and the manifold 430 and the cable carrier 400B does not change. Since the end portion 420B of the cable carrier 400B is fixed to the bottom panel of the frame 30B, the length of each type of cable between the end portion 420B of the cable carrier 400B and the temperature controller 320 and the hot runner controller 330 does not change. Since the cable carrier 400B guides each type of cable to accompany the movement of the mold 100B, the shapes of the cables do change. Since the end portion 410B is fixed to the slide 3032, and the end portion 420B is fixed to the bottom panel of the frame 30B, the length of each type of cable is adjusted by a loop formed in the X-axis direction of the cable carrier 400B becoming larger or smaller.

As a result of the above-described configuration, the cable carrier 400A/400B operates along with the movement of the mold 100A/100B. Because the movement of the cables extending from the mold 100A/100B respectively is controlled by the cable carrier 400A/400B, the possibility that any cables obstruct the movement of the mold 100A/100B is reduced. Since the cable carrier's 400B end portion 420B is located below the top panel of the frame 30B along which the mold 100B moves, the possibility that any cables obstruct the movement of the mold 100B is further reduced. The present exemplary embodiment provides a configuration that can be seen to be lower in cost than the configuration of the previous exemplary embodiment since the guiding component 450 of the previous exemplary embodiment is not utilized in the present exemplary embodiment.

According to the configuration of the above-described present exemplary embodiment, the cables connected to the mold 100B are separated into three areas. The area is an area from the mold 100B to the end portion 410B of the cable carrier 400B. The second area is an area from the end portion 410B of the cable carrier 400B to the end portion 420B of the cable carrier 400B. The third area is an area from the end portion 420B of the cable carrier 400B to the temperature controller 320 or the hot runner controller 330. The first area moves against the frame 30B along with the movement of the mold 100B, but the shape of the cables does not change. The second area moves against the frame 30B, and the shape of the cables changes. The third area does not move against the frame 30B, but it is fixed to the frame 30B.

Since the cables in the second area change their shape, the cables in the second area can wear out quicker than the cables in the other areas. By arranging the second area below the frame 30B as much as possible, the possibility of the cooling water contacting the roller 32/33 or the conveyance unit 31B can be reduced even if a temperature control hose wears out and cooling water leaks out.

Based on the configuration of the above-described present exemplary embodiment, to protect the second area where a load is applied to the cables, the cable carrier 400A/400B was installed. However, this configuration is not seen to be limiting. In another exemplary embodiment, if each type of cable has sufficient strength, the cable carrier 400A/400B need not always be installed.

Figure 12:
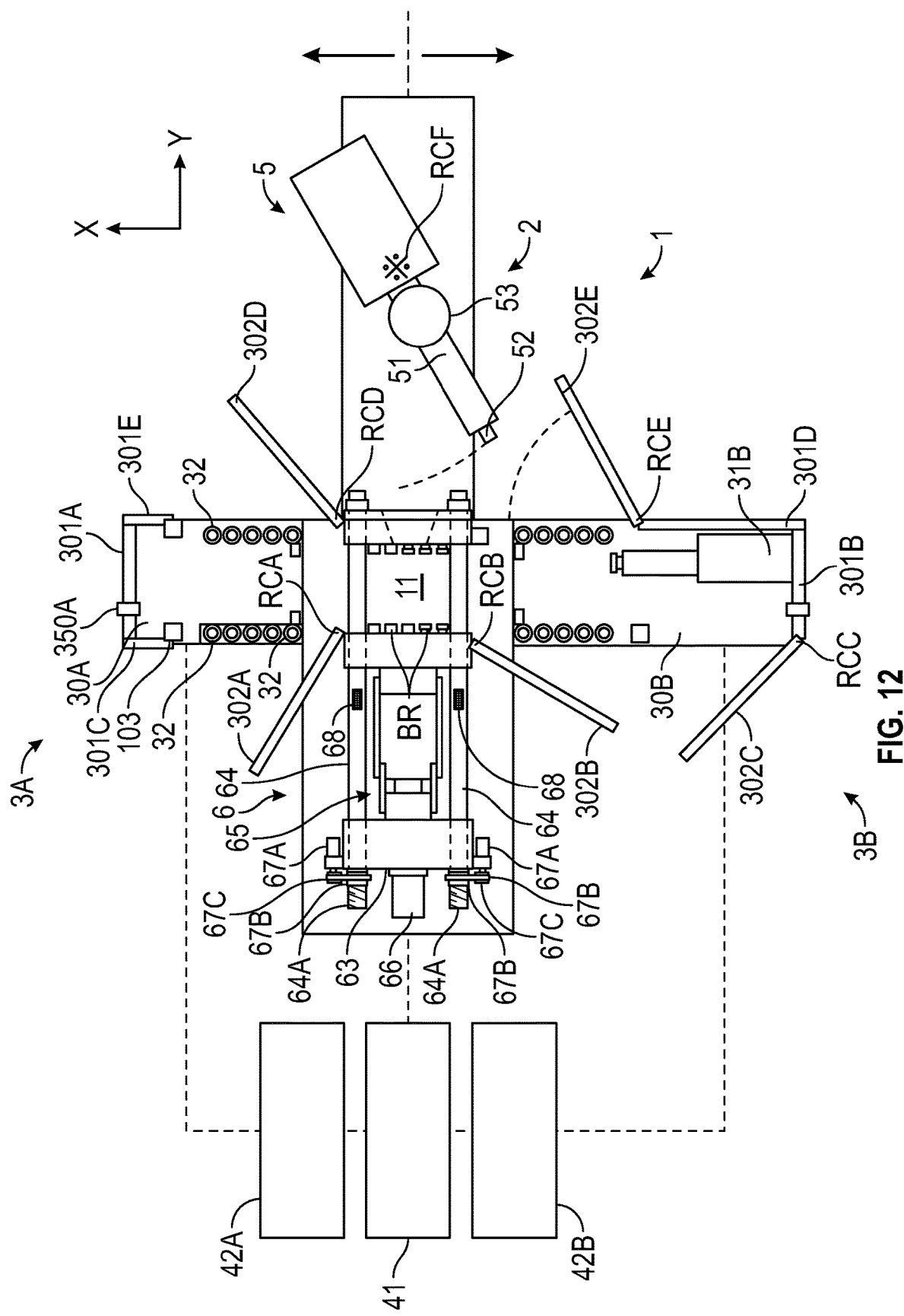
FIG. 12 illustrates the configuration and procedure for performing maintenance on a nozzle of the injection device.

The configuration and procedure for performing maintenance on the nozzle 52 of the injection device 5 will now be explained with reference to FIG. 12. Maintenance of the nozzle 52 is conducted by exchanging the screw 51*a*, which is located inside the injection cylinder 51. Maintenance becomes necessary when changing a molding resin or when an issue with the injection device 5 occurs.

To perform the maintenance, first, the molds 100A and 100B need to be removed from the IMM2, the conveyor device 3A, and the conveyor device 3B respectively. At this time, the molds 100A and 100B can be accessed by opening at least one of the safety doors 302A-E. Thus, the size of the safety doors 302A-E need to be larger than the size of molds 100A and 100B.

After molds 100A and 100B are removed, the temperature of the nozzle 52 is permitted to rise to a specified temperature. While the temperature rises or after the temperature has risen, a safety door 302E can be opened on a safety wall 301D side with a rotating center RCE in the center. After opening the safety door 302E, the injection device 5 is rotated to the operation side with a rotating center RCF as the center. This position is deemed to be the maintenance position. Before the described rotating motion occurs, the injection device 5 evacuates, in a forward direction along the Y-axis from the position of FIG. 1, to create a condition where the nozzle 52 does not contact other components. The position illustrated in FIG. 1 is deemed the injection position. After rotation of the injection device 5, a tip of the nozzle 52 is detached. Then, the screw 51*a* and the driving unit 54 are separated.

Figure 13:
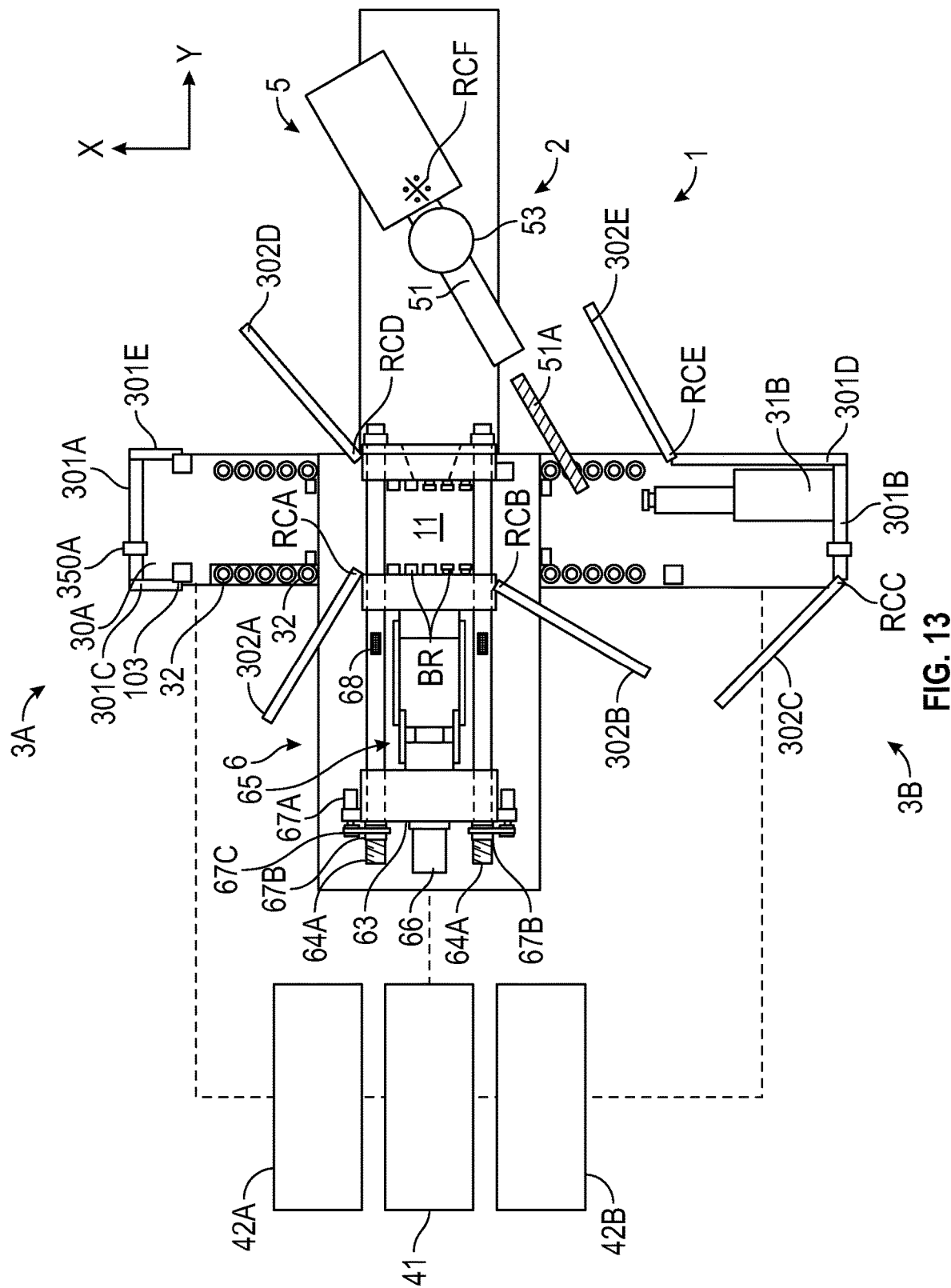
FIG. 13 illustrates the injection molding machine with a screw removed from a cylinder.

FIG. 13 illustrates the screw 51*a* removed from the cylinder 51. When the tip of the nozzle 52 has been removed, the screw 51*a* pops out from the cylinder 51. The screw 51*a* typically consists of steel, and thus is a heavy object. As such, it is necessary to hoist the screw 51*a* with a crane (not illustrated). After the screw 51*a* has been hoisted by a crane, the screw 51*a* can be removed via different methods, such as, but not limited to, manpower, special jig, etc. The screws 51*a* center of gravity is taken into account when changing the position where the crane is hoisting or increasing the locations where the crane performs the hoisting.

After the screw 51*a* has been removed, the screw 51*a* is hoisted in an upward direction with the crane and placed in a specified location. After any needed cleaning work is completed, a screw 51*a*', different from screw 51*a*, is hoisted with the crane and installed in parallel to the cylinder 51 as illustrated in FIG. 13. Following installation of the screw 51*a*' parallel to the cylinder 51, screw 51*a*' is gradually inserted into the cylinder 51 using the crane. Insertion of the screw 51*a*' is considered complete when the screw 51*a*' contacts the driving unit 54. Upon insertion completion, the screw 51*a*' and the driving unit 54 are linked, and the tip of the nozzle 52 is mounted. After mounting the tip of the nozzle 52, the injection device 5 is rotated to the non-operation side with the rotational center RCF as the center, and becomes parallel to the frame 10. Once the injection device 5 is parallel to the frame 10, the safety door 302E is closed on the IMM2 side with the rotational center RCE as the center.

The safety door 302E is always opened before the injection device 5 is rotated to the operation side, and always closed after the injection device 5 is rotated to the non-operation side. This prevents the screw 51*a* that was removed from the rotated injection device 5 from interfering with the safety door 302E.

Specifying the rotational direction of the injection device 5 and the opening and closing direction of the safety door 302E and the order, as described above, when performing maintenance on the injection device 5 eliminates interference between the injection device 5 and the safety door 302E.

Returning to FIG. 12, the safety door 302A is opened on the IMM2 side with the rotational center RCA as the center. The safety door 302B is opened on the IMM 2 side with the rotational center RCB as the center. The safety door 302C is opened on the side opposite to the IMM 2 with the rotational center RCC as the center. The safety door 302D is opened on the IMM 2 side with the rotational center RCD as the center. This configuration is not seen to be limiting, In another exemplary embodiment, the safety doors 302A, 302/B, and 302D can open on the opposite side of the IMM 2, while the safety door 302C can be opened on the IMM2 side. In another exemplary embodiment, if the screw 51*a* is long and there is a possibility when the screw 51*a* is removed from the cylinder 51, the screw 51*a* will interfere with the safety doors 302E, 302B, and 302C, the safety doors 30 2B and 302C are configured to be opened/closed in the direction illustrated in FIG. 12.

The above-described configuration can also be applied to the situation where the safety door 302E interferes with the injection device 5 that is in the maintenance position when attempting to open the safety door 302E.

Figure 14:
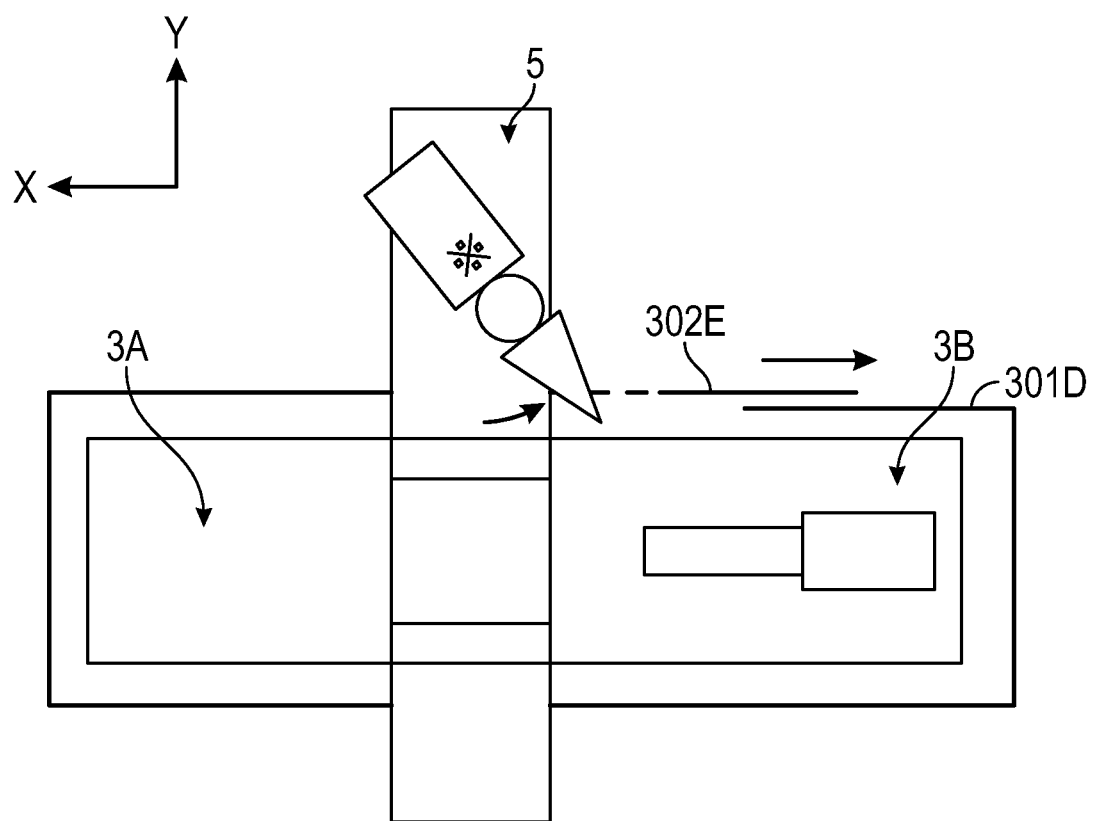
FIG. 14 is illustrates the injection molding machine with a sliding door that can be opened if a safety door is on a side of a safety wall.

FIG. 14 illustrates the IMM2 with a sliding door that can be opened if the safety door 302E is on a side of the safety wall 301D. In another exemplary embodiment, the sliding door can be removed entirely.

Figure 15B:
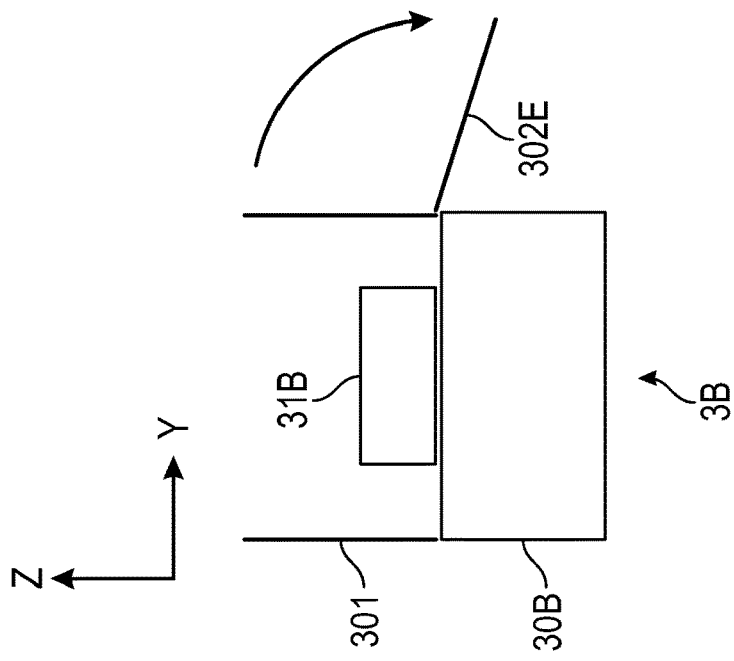
FIG. 15b illustrates the injection molding machine viewed from the X-axis direction.
Figure 15A:
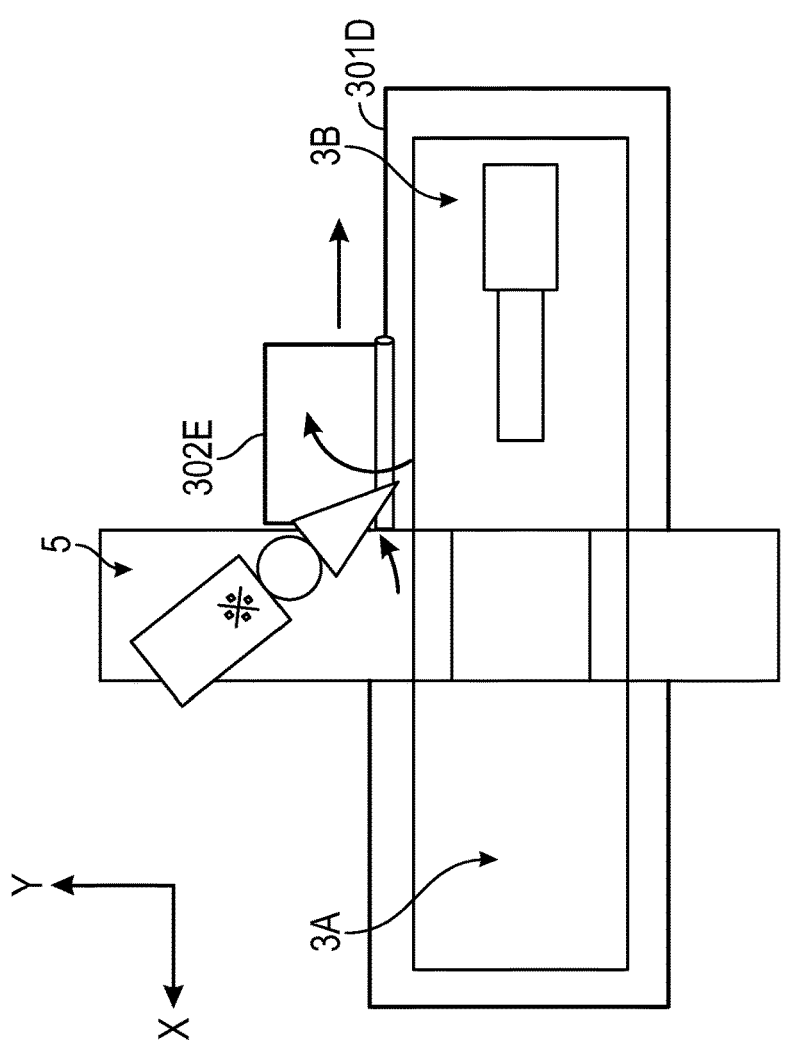
FIG. 15a illustrates the injection molding machine viewed from the Z-axis direction

FIG. 15a and FIG. 15b illustrate a configuration where the safety door 302E rotates with the X-axis as the center. FIG. 15 is an illustration of the configuration viewed from the Z-axis direction. FIG. 15 b is an illustration of the configuration viewed from the X-axis direction. The configuration illustrated in FIG. 15a and FIG. 15b enable the safety door 302E to rotate to the lower side with the X-axis as the center. In another exemplary embodiment, the configuration is such that the safety door 302E rotates to the upper side.

Figure 16:
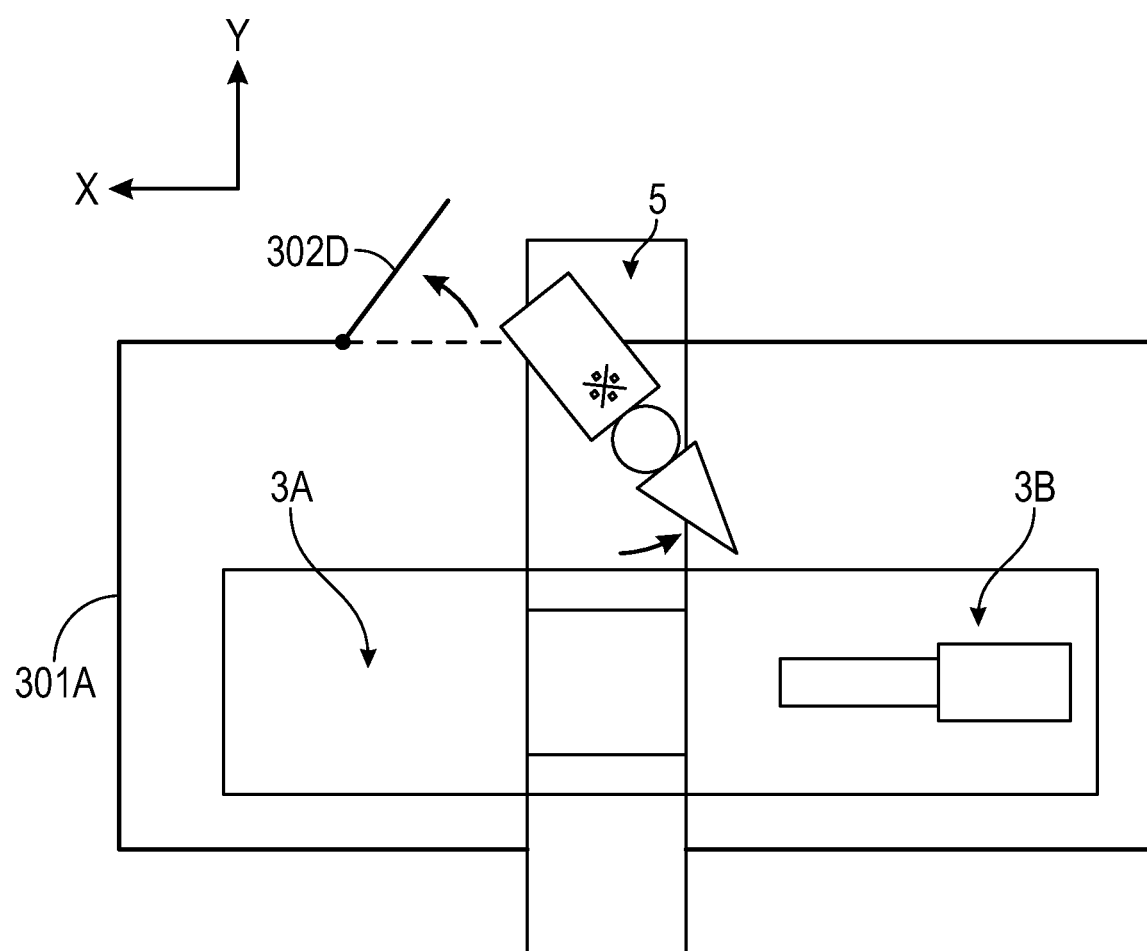
FIG. 16 illustrates the rotational direction of a safety door with respect to an injection device.
Figure 17:
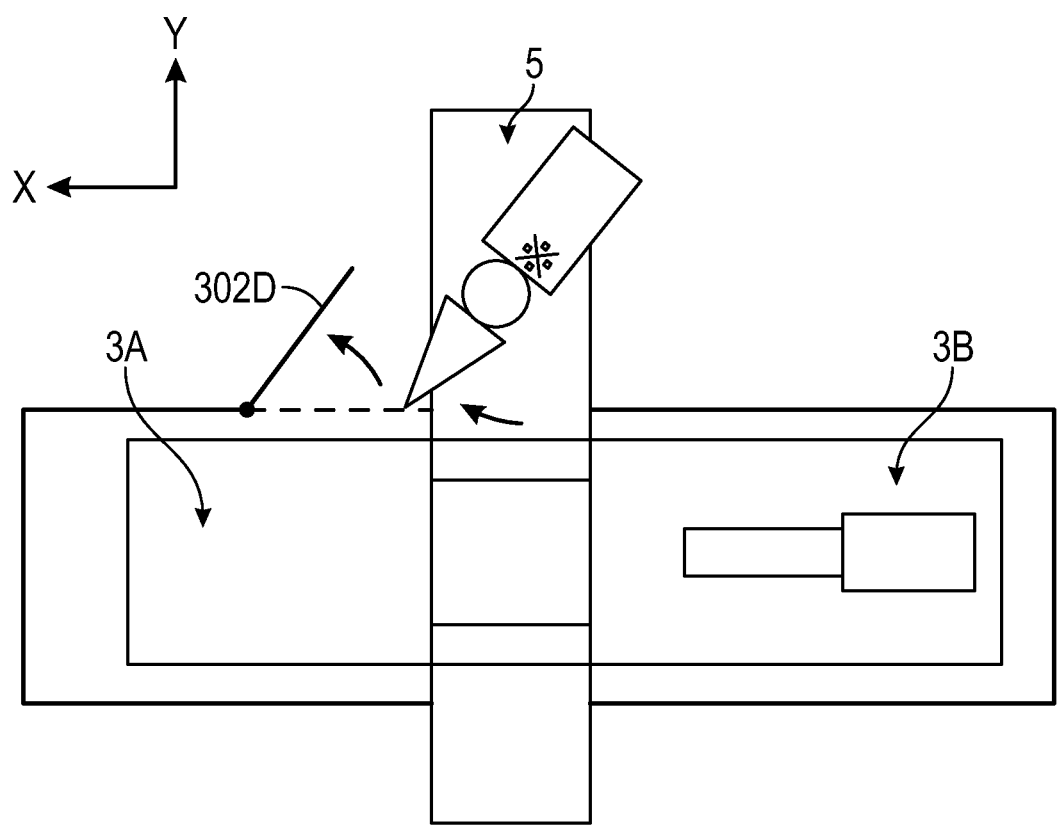
FIG. 17 illustrates an alternative rotational direction for an injection device.

As illustrated in FIG. 16, the rotational direction of the safety door 302D is set to the opposite direction of the location of the injection device 5. This ensures that the movement of the safety door 302D does not interfere with the injection device 5. In another embodiment, as illustrated in FIG. 17, the rotational direction of the injection device 5 can be in the opposite direction of the direction illustrated in FIG. 12. This enables addressing the same topic by applying the direction in which the safety door 302E opens and the order thereof to the safety door 302D.

Figure 18:
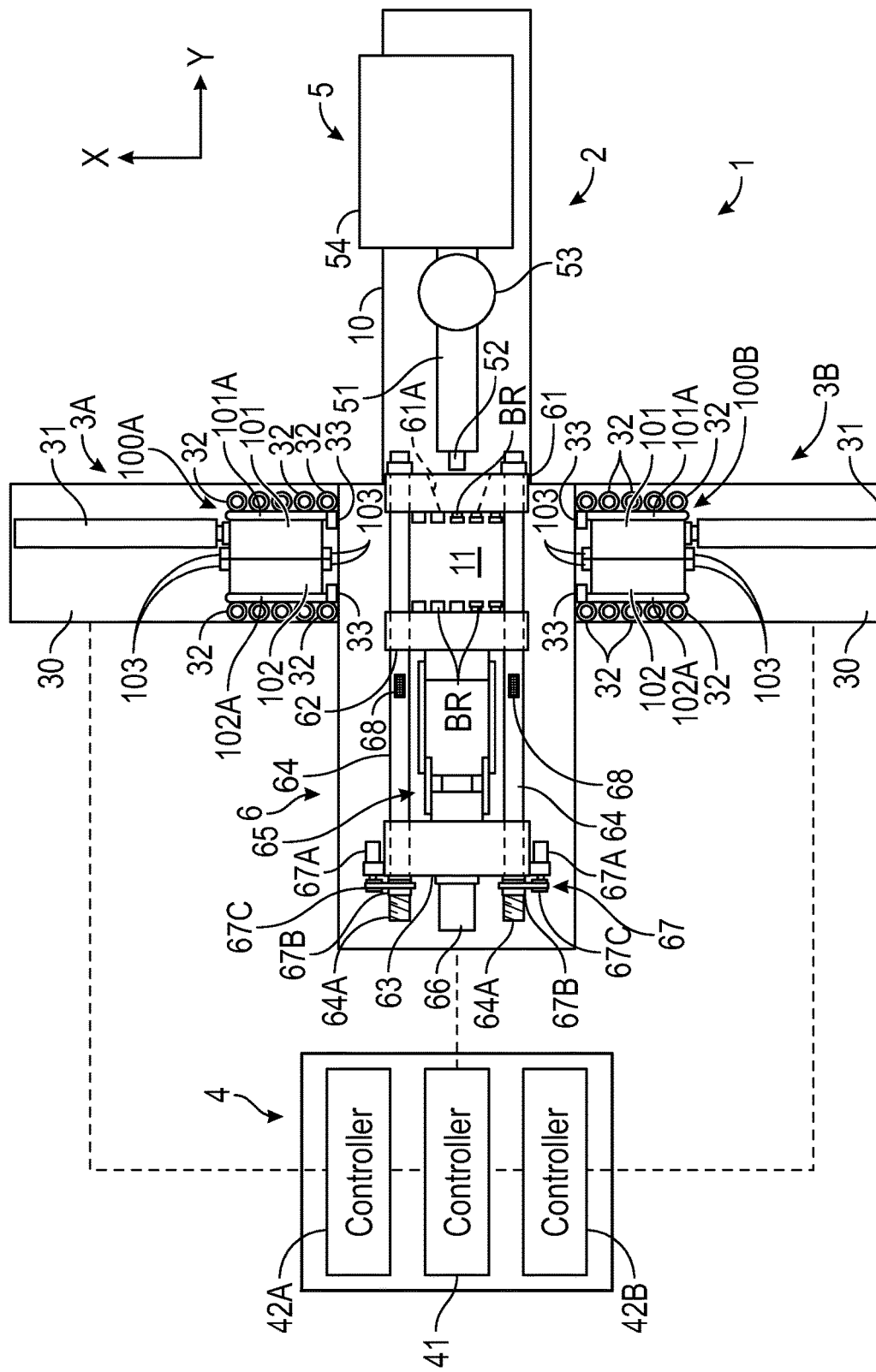
FIG. 18 illustrates an injection molding system.

FIG. 1 illustrates a configuration according to an exemplary embodiment of the present disclosure and provides an improvement over the configuration illustrated in FIG. 18. As illustrated in FIG. 1, conveyor devices 3A and 3B are surrounded by safety wall 301A and safety wall 301B respectively. Safety wall 301A/301B includes two parallel walls (hereinafter referred to as 'first walls) located along the X-axis direction and a wall (hereinafter referred to as "second wall") located along the Y-axis direction. One end of the first walls is fixed to the second wall and the other end of the first walls is fixed to an exterior covering plate 60 (see FIG. 4) of the IMM2.

As illustrated in FIG. 1, safety walls 301A and 301B along with the exterior covering plate define rectangular shaped areas (hereinafter referred to as "conveyor areas") that enclose conveyor devices 3A and 3B respectively. Because conveyor devices 3A and 3B move the molds 100A and 100B, operators need to be kept away from the conveyor devices 3A and 3B when the molds 100A and 100B are moved. The height of the first wall, the height of the second wall, and the size of the conveyor areas are situation specific and are designed as needed for safety and productivity purposes. In another exemplary embodiment, the conveyor areas need not be enclosed areas. However, should any gaps between devices, components, etc., exist in such a configuration, the size of these gaps are narrow to prevent insertion of operator's fingers, etc.

An alert device 350A/350B provides safety and productivity status/state related notification associated with the conveyor device 3A/3B and the IMM2. The alert device 350A/350B can be a buzzer, one or more LEDs, a display, any combination of these, or any other device, component, method that enables notification of safety and productivity related information. The alert device 350A is controlled by a conveyor device controller 42A while the alert device 350B is controlled by a conveyor device controller 42B. The alert device 350A/350A is typically situated in a location where operators have easy access to it. In one exemplary embodiment, the alert device 350A/350B is located on a top surface of the safety wall 301A/301B. In another exemplary embodiment, the injection molding system 1 includes one alert device that provides notifications to operators of the state/status of all conveyor devices and an injection molding machine.

The safety wall 301A/301B includes a safety door 302A/302B with a door lock (not illustrated). The safety wall 301A/301B and the safety door 302A/302B are located on the top panel of the frame 30A/30B. The safety door 302A/302B can be opened, for example, when operators unload the mold 100A/100B from the conveyor device 3A/3B, and can be closed and locked while the molds 100A and 100B are moved by the conveyor devices 3A and 3B. The safety door 302A/302B can be unlocked manually either from inside or outside the respective conveyor area. The safety door 302A/302B in combination with a mold door 390A/390B provides additional safety to operators working at conveyor devices 3A and 3B. The safety door 302A/302B and/or the door lock can be controlled electronically by the conveyor controller 42A/42B. In another exemplary embodiment, while conveyor devices 3A and 3B move the molds 100A and 100B, the conveyor controller 42A/42B shuts and/or locks the safety door 302A/302B to keep operators away from the conveyor areas.

When the mold door 390B is open and the opening 60B is exposed, ejection and insertion of the mold 100B from and to the molding operation position 11 can occur. The mold door 390B is slidable, can be opened or closed manually, and closes the opening 60B when closed. While in the present embodiment the mold door 390B is slidable, this movement method is not seen to be limiting and any method enabling opening and closing of the mold door 390B is applicable. When preparation work, such as replacing the mold 100B with another mold, the opening 60B can be closed by the mold door 390B. Another opening, not illustrated, is formed on the opposite side of the IMM2.

In another exemplary embodiment, the safety door 302A/302B includes a sensor to detect the open/close state of the door lock. In another exemplary embodiment, when the safety door 302B is opened, the controller 42B prevents the conveyance unit 31B from to ejecting/inserting the mold 100B. This reduces the possibility of operators contacting any moving components, such as the mold 100B or any part of the conveyance unit 31B.

In another exemplary embodiment, when one mold is inserted from one side of the IMM2, the mold door at that side of the IMM2 typically remains open since the conveyance unit 31B at that enters the IMM2 for inserting the mold. The safety door 302B should be kept closed to prevent operators from touching the mold 100A as it intermittently moves. The controller 42B stops the injection molding process when the safety door 302B is opened.

In still yet another exemplary embodiment, the controller 42A/42B causes the alert device 350A/350B to issue a warning in response to the controller 42A/42B detecting the opening of both the safety door 302A/302B and the mold door 390A/390B on the same side of the IMM2. In addition to issuance of a warning, the injection molding process can be stopped.

As described above, the mold door 390A/390B can be opened or closed manually. In another exemplary embodiment, the injection molding system 1 can include a sensor that detects the opened/closed state of the mold door 390A/390B. The mold door 390A/390B on one side of the IMM2 should be kept closed while the injection molding is performed with the mold inserted from the other side of the IMM2. In the case where the mold 100A is ejected by the conveyor device 3A and the mold 100B by the conveyor device 3B, the mold door 390B should be opened because the conveyance unit 31B is linked with the mold 100B via the linked unit 3020. The mold door 390A should be kept closed for the operators' safety because when the mold 100A is ejected, the operators can unload the mold 100A and prepare another mold. If the mold door 390A is opened while the injection molding in the IMM2 is being performed, the controller 41 detects that the mold door 390A is open, and stops the injection molding process.

In the above-configuration where the mold door 390A/390B is opened or closed manually and the injection molding system 1 includes a sensor that detects the opened/closed state of the mold door 390A/390B, in another exemplary embodiment, the alert device 350A/350B can issue an alert or warning where:

(1) the mold 100A has been ejected to the conveyor device 3A,
(2) injection molding is or is about to be performed, with the mold 100B, and
(3) the mold door 390A is open.

The alert notifies operators the mold door 390A is open while injection molding is performed. The alert can be stopped when the mold door 390A is closed, or the injection molding system 1 detects that the mold exchange or mold unloading process is completed.

In another exemplary embodiment, the mold door 390A/390B is closed or opened by an actuator controlled by the controller 41. In this exemplary embodiment, when injection molding with the mold 100B is performed after the mold 100A is ejected, the mold door 390A is forced closed after the mold 100A has been ejected. This improves the operators' safety during unloading/exchanging of the mold 100A.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like. An I/O interface can be used to provide communication interfaces to input and output devices, which may include a keyboard, a display, a mouse, a touch screen, touchless interface (e.g., a gesture recognition device), a printing device, a light pen, an optical storage device, a scanner, a microphone, a camera, a drive, communication cable and a network (either wired or wireless).

DEFINITIONS

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An injection molding system comprising:
    an injection molding apparatus configured to perform injection molding with at least one mold, the injection molding system including a cable carrier and a connector; and
    a conveyor apparatus configured to move the at least one mold along a supporting plane in a predetermined direction, wherein:
    the cable carrier is configured to cover a first cable connected to the at least one mold,
    a shape of the cable carrier changes for guiding the first cable based on a movement of the at least one mold by the conveyor apparatus,
    at least one of a first end of the cable carrier or a second end of the cable carrier are located below the supporting plane in a vertical direction perpendicular to the supporting plane,
    the connector is configured to connect the first cable and a second cable, the connector being provided at a bottom portion of the conveyor apparatus, the bottom portion being below the supporting plane in the vertical direction, and
    the first cable covered with the cable carrier is configured to extend inside the bottom portion of the conveyor apparatus, and is guided in the predetermined direction with the first cable being connected to the connector.

2. The injection molding system according to claim 1, wherein both the first end and the second end of the cable carrier are located below the supporting plane in the vertical direction.

3. The injection molding system according to claim 1, wherein the conveyor apparatus is configured to move the at least one mold between a first position where injection process is performed and a second position different from the first position.

4. The injection molding system according to claim 1, wherein the first cable is at least one of a heater cable, a thermocouple cable, or an air hose.

5. The injection molding system according to claim 1, wherein the first cable connects between the at least one mold and a controller for adjusting a temperature of the at least one mold.

6. The injection molding system according to claim 1, wherein the first cable is separated into at least three sections by at least two connectors, and wherein the cable carrier covers one of the at least three sections of the first cable.

7. The injection molding system according to claim 1, wherein the first end of the cable carrier is located above the supporting plane in the vertical direction, and the second end of the cable carrier is located below the supporting plane in the vertical direction.

8. The injection molding system according to claim 1, wherein the second cable is configured to extend outside the bottom portion of the conveyor apparatus and is connected to a device located below the injection molding apparatus in the vertical direction.

9. The injection molding system according to claim 1, wherein:
    the conveyor apparatus includes a first device configured to support the at least one mold, and a second device configured to support another mold,
    the injection molding apparatus is located between the first device and the second device in the predetermined direction,
    the injection molding system includes a second cable carrier configured to cover a third cable,
    the first cable is connected to the at least one mold, and the third cable is connected to the another mold, and
    the third cable covered with the second cable carrier extends below the second device in the vertical direction and is guided in the predetermined direction with the third cable being connected to a device to which the first cable is connected.

10. The injection molding system according to claim 1, wherein the conveyor apparatus is configured to move the at least one mold between a first position where injection process is performed and a second position on the supporting plane of the device, and is configured to move another mold between the first position and a third position on the supporting plane of another device.

11. A conveyor apparatus configured to move a mold along a supporting plane in a predetermined direction, wherein the conveyor apparatus is operably coupled to an injection molding apparatus configured to perform injection molding with the mold moved by the conveyor apparatus, the conveyor apparatus comprising:
    a cable carrier configured to cover a first cable connected to the mold; and
    a connector configured to connect the first cable and a second cable, the connector being provided at a bottom portion of the conveyor apparatus, the bottom portion being below the supporting plane in a vertical direction perpendicular to the supporting plane, wherein:
    a shape of the cable carrier changes for guiding the first cable based on a mold movement by the conveyor apparatus,
    at least one of a first end of the cable carrier or a second end of the cable carrier are located below the supporting plane in the vertical direction, and
    the first cable covered with the cable carrier is configured to extend inside the bottom portion of the conveyor apparatus, and is guided in the predetermined direction with the first cable being connected to the connector.

12. The conveyor apparatus according to claim 11, wherein both the first end and the second end of the cable carrier are located below the supporting plane in the vertical direction.

13. The conveyor apparatus according to claim 11, wherein the conveyor apparatus is configured to move the mold between a first position where injection process is performed and a second position different from the first position.

14. The conveyor apparatus according to claim 11, wherein the first cable is at least one of a heater cable, a thermocouple cable, or an air hose.

15. The conveyor apparatus according to claim 11, wherein the first cable connects between the mold and a controller for adjusting a temperature of the mold.

16. The conveyor apparatus according to claim 11, wherein the first cable is separated into at least three sections by at least two connectors, and wherein the cable carrier covers one of the at least three sections of the first cable.

17. The conveyor apparatus according to claim 11, wherein the first end of the cable carrier is located above the supporting plane in the vertical direction, and the second end of the cable carrier is located below the supporting plane in the vertical direction.

18. The conveyor apparatus according to claim 11, wherein the second cable is configured to extend outside the bottom portion of the conveyor apparatus and is connected to a device located below the injection molding apparatus in the vertical direction.

19. The conveyor apparatus according to claim 11, comprising a first device configured to support the mold, and a second device configured to support another mold, wherein
the injection molding apparatus is located between the first device and the second device in the predetermined direction,
the conveyor apparatus further comprises a second cable carrier configured to cover a third cable,
the first cable is connected to the mold, and the third cable is connected to the another mold, and
the third cable covered with the second cable carrier extends below the second device in the vertical direction and is guided in the predetermined direction with the third cable being connected to a device to which the first cable is connected.

20. The conveyor apparatus according to claim 19, wherein the conveyor apparatus is configured to move the mold between a first position where an injection process is performed and a second position on the supporting plane of the device, and is configured to move the another mold between the first position and a third position on the supporting plane of the second device.

* * * * *